(12) United States Patent
Park

(10) Patent No.: US 10,073,688 B2
(45) Date of Patent: Sep. 11, 2018

(54) METHOD AND APPARATUS FOR EXECUTING APPLICATION

(71) Applicant: SAMSUNG ELECTRONICS CO., LTD., Suwon-si (KR)

(72) Inventor: Ho-Yeon Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 325 days.

(21) Appl. No.: 14/291,533

(22) Filed: May 30, 2014

(65) Prior Publication Data

US 2014/0358998 A1 Dec. 4, 2014

(30) Foreign Application Priority Data

May 30, 2013 (KR) .................... 10-2013-0062112

(51) Int. Cl.
| | | |
|---|---|---|
| *G06F 8/60* | (2018.01) | |
| *G06F 9/451* | (2018.01) | |
| *G06F 9/455* | (2018.01) | |
| *H04L 29/08* | (2006.01) | |
| *G06F 9/50* | (2006.01) | |

(52) U.S. Cl.
CPC ............. *G06F 8/60* (2013.01); *G06F 9/452* (2018.02); *G06F 9/5027* (2013.01); *H04L 67/34* (2013.01); *G06F 9/455* (2013.01); *G06F 2209/509* (2013.01); *G06F 2209/549* (2013.01)

(58) Field of Classification Search
CPC ......... G06F 2209/509; G06F 2209/549; G06F 8/60; G06F 9/4445; G06F 9/455; G06F 9/5027; G06F 17/30905; H04L 67/34; H04L 67/02
See application file for complete search history.

(56) References Cited

U.S. PATENT DOCUMENTS

| | | | | |
|---|---|---|---|---|
| 5,727,159 A | * | 3/1998 | Kikinis | G06F 17/30905 707/E17.121 |
| 5,911,776 A | * | 6/1999 | Guck | G06F 17/30569 707/999.104 |
| 6,119,155 A | * | 9/2000 | Rossmann | G06F 3/0237 707/E17.013 |
| 6,128,663 A | * | 10/2000 | Thomas | G06Q 30/02 709/217 |
| 6,134,598 A | * | 10/2000 | Raman | G06F 17/2264 707/E17.006 |
| 6,310,601 B1 | * | 10/2001 | Moore | G06F 3/14 345/660 |

(Continued)

FOREIGN PATENT DOCUMENTS

| | | |
|---|---|---|
| KR | 10-2012-0030126 A | 3/2012 |
| KR | 10-2012-0046807 A | 5/2012 |

*Primary Examiner* — Uzma Alam
(74) *Attorney, Agent, or Firm* — Staas & Halsey LLP

(57) ABSTRACT

A method of executing, by a terminal, an application that is provided from an application server. The method includes operations of receiving, from the application server, execution environment information about the application; determining whether to execute a virtual application, by referring to the execution environment information; displaying an interface so as to request a virtualization server that performs application virtualization for virtualization, based on a result of the determining; and requesting the virtualization server for virtualization of the application, based on a user input via the interface.

23 Claims, 17 Drawing Sheets

(56) References Cited

U.S. PATENT DOCUMENTS

| | | | | |
|---|---|---|---|---|
| 6,345,293 | B1* | 2/2002 | Chaddha | G06F 17/30867 707/999.104 |
| 6,359,633 | B1* | 3/2002 | Balasubramaniam | G06F 17/30905 707/E17.121 |
| 6,360,249 | B1* | 3/2002 | Courts | G06F 17/3089 707/E17.116 |
| 6,509,913 | B2* | 1/2003 | Martin, Jr. | G06F 9/4443 455/566 |
| 6,601,108 | B1* | 7/2003 | Marmor | G06F 17/30569 707/E17.006 |
| 6,622,168 | B1* | 9/2003 | Datta | G06F 17/30902 707/E17.12 |
| 6,654,814 | B1* | 11/2003 | Britton | G06F 17/30905 707/E17.121 |
| 6,658,167 | B1* | 12/2003 | Lee | H04L 67/42 382/305 |
| 6,662,218 | B2* | 12/2003 | Mighdoll | G06F 8/65 348/E5.105 |
| 6,701,143 | B1* | 3/2004 | Dukach | G08G 1/127 455/414.1 |
| 6,701,362 | B1* | 3/2004 | Subramonian | H04L 29/06 709/224 |
| 6,711,611 | B2* | 3/2004 | Hanhan | G06Q 10/06 709/218 |
| 6,925,595 | B1* | 8/2005 | Whitledge | G06F 17/30905 707/999.004 |
| 8,494,964 | B1* | 7/2013 | Sanderson | G06F 21/121 380/227 |
| 9,104,517 | B2* | 8/2015 | Obata | G06F 8/61 |
| 9,197,720 | B2* | 11/2015 | Fernandez-Ruiz | H04L 67/42 |
| 2002/0073235 | A1* | 6/2002 | Chen | G06F 17/30905 709/246 |
| 2002/0133630 | A1* | 9/2002 | Navare | G06F 9/45537 709/250 |
| 2008/0075049 | A1* | 3/2008 | Xie | H04L 67/306 370/338 |
| 2009/0005025 | A1* | 1/2009 | Irac | G06F 9/4443 455/418 |
| 2009/0089363 | A1* | 4/2009 | Keohane | H04L 67/14 709/203 |
| 2009/0221269 | A1* | 9/2009 | Bulmer | H04M 1/72525 455/414.1 |
| 2010/0228880 | A1* | 9/2010 | Hunt | G06F 17/30905 709/246 |
| 2011/0252082 | A1* | 10/2011 | Cobb | H04L 65/605 709/203 |
| 2011/0270915 | A1* | 11/2011 | Morard | G06F 9/4445 709/203 |
| 2011/0289513 | A1* | 11/2011 | Degirmenci | G06F 9/542 719/313 |
| 2012/0072487 | A1* | 3/2012 | Binyamin | H04L 67/16 709/203 |
| 2012/0096071 | A1* | 4/2012 | Murphey | G06F 8/63 709/203 |
| 2012/0303818 | A1* | 11/2012 | Thibeault | G06F 9/5072 709/226 |
| 2013/0254401 | A1* | 9/2013 | Marshall | G06F 21/6218 709/226 |
| 2013/0290410 | A1* | 10/2013 | Zhang | H04L 67/42 709/203 |
| 2013/0346949 | A1* | 12/2013 | Chang | G06F 9/45529 717/127 |
| 2014/0053054 | A1* | 2/2014 | Shen | G06F 17/30905 715/234 |
| 2014/0122729 | A1* | 5/2014 | Hon | H04L 67/04 709/228 |
| 2014/0280950 | A1* | 9/2014 | Bhanujan | H04L 67/1002 709/226 |
| 2014/0281008 | A1* | 9/2014 | Muthiah | H04L 29/0651 709/231 |

* cited by examiner

FIG. 5B

```
<AppRequest>
    <AppInfo>
        <AppID>1203-12421-ed2d-2add or http://www.naver.com/abc.apk</AppID>  ⎫
        <Size>2.4MB</Size>                                                    ⎬ 510b
        <Platform>Android</Platform>                                          ⎪
        <MinPlatformVersion>GINGERBREAD</MinPlatformVersion>                  ⎭
        ...
    </AppInfo>
    <ServerInfo>
        <ID>1(Samsung App Server)</ID>                                        ⎫ 520b
        <Location>http://www.samsungappstore.com</Location>                   ⎭
        ...
    </ServerInfo>
    <DeviceInfo>
        <Player>
            <PlayerVersion>1.0.2.3,</PlayerVersion>                           ⎫
            <SupportedCodec>H.264</SupportedCodec>                            ⎪
        </Player>                                                             ⎪
        <ModelNumber>SHW-M2505</ModelNumber>                                  ⎬ 530b
        <FirmwareVersion>2.3.4</FirmwareVersion>                              ⎪
        <BuildNumber>GINGERBREAD.EJ04<BuildNumber>                            ⎪
        <Resolution>1024*768</Resolution>                                     ⎭
        ...
    </DeviceInfo>
    <UserInfo>
        <ID>abcde</ID>                                                        ⎬ 540b
        ...
    </UserInfo>
    ...
</AppRequest>
```

METHOD AND APPARATUS FOR EXECUTING APPLICATION

CROSS-REFERENCE TO RELATED APPLICATIONS

This application claims the priority benefit of Korean Patent Application No. 10-2013-0062112, filed on May 30, 2013, in the Korean Intellectual Property Office, the disclosure of which is incorporated herein in its entirety by reference.

BACKGROUND

1. Field

The present disclosure relates to a method and apparatus for executing an application in a terminal, and more particularly, to a method and apparatus for executing a virtual application, based on the virtual application in a terminal.

2. Description of the Related Art

Recent various terminals, such as mobile devices or TVs, have a configuration in which a user downloads a user-desired application from an external application server and installs the user-desired application. Also, a communication speed between a terminal and a server rapidly increases, types of applications that may be executed in the terminal increase, and functions of an application vary.

Thus, there is an increase in cases in which a user may not execute an application due to a shortage of resources, a hardware function problem, or a software problem, for example. In order to solve the problems, there is a demand for application virtualization in which a server partially or completely executes an application and then a terminal receives a result of the execution.

SUMMARY

Additional aspects and/or advantages will be set forth in part in the description which follows and, in part, will be apparent from the description, or may be learned by practice of the disclosure.

The present disclosure provides a method and apparatus for smoothly executing an application in a terminal although the terminal may not execute the application or has insufficient functions.

The present disclosure also provides a method and apparatus for optimizing execution of an application, in consideration of a status of the terminal, a characteristic of the application, a current network status, or the like.

According to a first aspect of the present disclosure, there is provided a method of executing, by a terminal, an application that is provided from an application server, the method including operations of receiving, from the application server, execution environment information about the application; determining whether to execute a virtual application, by referring to the execution environment information; displaying a menu so as to request a virtualization server that performs application virtualization for virtualization, based on a result of the determining; and requesting the virtualization server for virtualization of the application, based on a user input via the menu.

The method may further include operations of receiving, from the virtualization server, data that configures an execution result screen of the application that is executed in the virtualization server; and rendering the execution result screen by using the data.

When the terminal is not capable of executing the application, the operation of determining may include an operation of determining to execute the application, and when the terminal is capable of executing the application, the operation of determining may include an operation of determining to download the application.

The operation of determining may include an operation of determining whether the terminal is capable of executing the application, based on whether the terminal includes a platform in which the application is driven, and hardware or software to drive the application.

The operation of determining may include an operation of determining whether the terminal is capable of executing the application, based on whether a resource of the terminal is sufficient for execution of the application.

The operation of determining may include an operation of determining whether the terminal is capable of executing the application, based on at least one of a resource of the terminal for execution of the virtual application, and a network status for communication with the virtualization server.

According to a second aspect of the present disclosure, there is provided a method of virtualizing an application, the method including operations of receiving, by a virtualization server performing application virtualization, an application virtualization request message from a terminal; determining whether to provide an application virtualization service to the terminal, by referring to the application virtualization request message; and performing virtualization on the application that is indicated by the application virtualization request message, based on the determining.

The operation of performing the virtualization may include operations of executing the application, by the virtualization server; and transmitting, to the terminal, data that configures an execution result screen of the application.

The application virtualization request message may include at least one of application information, application server information, terminal information, and terminal user information.

The method may further include an operation of setting a virtual machine for application execution, based on the application virtualization request message that is received from the terminal.

The operation of performing the virtualization may further include operations of determining whether an application is already downloaded to the virtualization server; and downloading the application from an application server, based on a result of the determining whether the application is already downloaded.

According to a third aspect of the present disclosure, there is provided a terminal that executes an application provided by an application server, the terminal including a communication unit communicating with a network; a virtual execution determining unit determining whether to execute a virtual application, by referring to execution environment information with respect to an application that is received from the application server via the communication unit; a display unit displaying a menu so as to request a virtualization server that performs application virtualization for virtualization, based on a result of the determining; and a virtualization executing unit requesting the virtualization server for virtualization of the application, based on a user input via the menu.

The virtualization executing unit may receive, from the virtualization server, data that configures an execution result screen of the application that is executed in the virtualization server, and may render the execution result screen by using the data.

When the terminal is not capable of executing the application, the determining may involve executing the application, and when the terminal is capable of executing the application, the determining may involve downloading the application.

The determining may involve determining whether the terminal is capable of executing the application, based on whether the terminal includes a platform in which the application is driven, and hardware or software to drive the application.

The determining may involve determining whether the terminal is capable of executing the application, based on whether a resource of the terminal is sufficient for execution of the application.

The determining may involve determining whether the terminal is capable of executing the application, based on at least one of a resource of the terminal for execution of the virtual application, and a network status for communication with the virtualization server.

According to a fourth aspect of the present disclosure, there is provided a virtualization server including a communication unit communicating with a network; a virtualization determining unit receiving an application virtualization request message from a terminal via the communication unit, and determining whether to provide an application virtualization service to the terminal, by referring to the application virtualization request message; and a virtualization unit performing virtualization on the application that is indicated by the application virtualization request message, based on the determining.

The virtualization unit may execute the application, and may transmit, to the terminal, data that configures an execution result screen of the application.

The application virtualization request message may include at least one of application information, application server information, terminal information, and terminal user information.

The virtualization unit may set a virtual machine for application execution, based on the application virtualization request message that is received from the terminal.

The virtualization server may further include a download unit determining whether an application is already downloaded to the virtualization server, and downloading the application from an application server, based on a result of the determining whether the application is already downloaded.

According to a fifth aspect of the present disclosure, there is provided a non-transitory computer-readable recording medium having recorded thereon a program for executing the method of the first aspect.

BRIEF DESCRIPTION OF THE DRAWINGS

The above and other features and advantages of the present disclosure will become more apparent by describing in detail exemplary embodiments thereof with reference to the attached drawings in which:

FIG. 5B illustrates an application virtualization request message that is generated by Extensible Markup Language (XML), according to an embodiment of the present disclosure;

DETAILED DESCRIPTION

Figure 1:
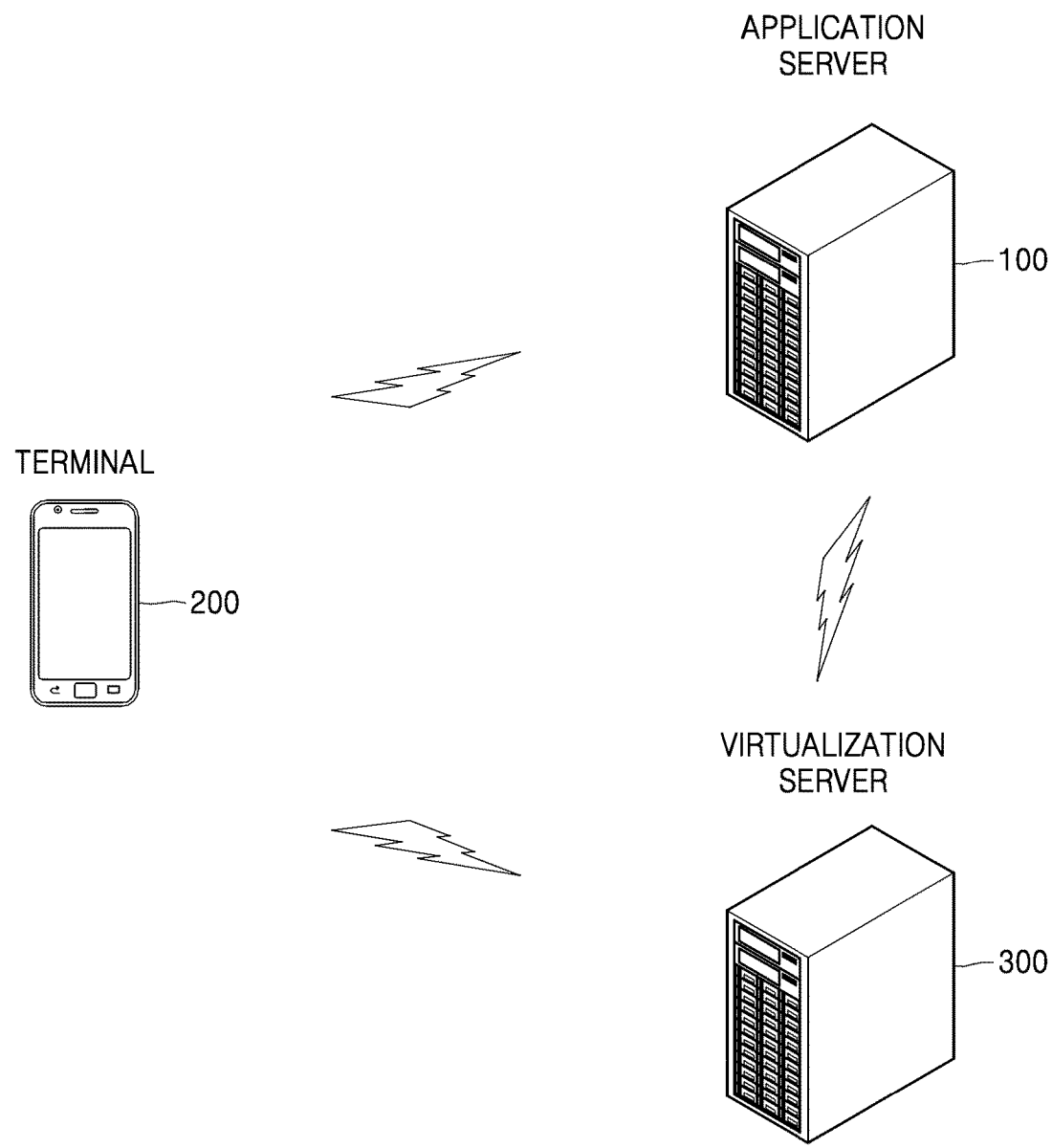
FIG. 1 illustrates an application virtualization system according to an embodiment of the present disclosure.

The present disclosure will now be described more fully with reference to the accompanying drawings, in which exemplary embodiments of the disclosure are shown. The disclosure may, however, be embodied in many different forms and should not be construed as being limited to embodiments set forth herein; rather, these embodiments are provided so that this disclosure will be thorough and complete, and will fully convey the concept of the disclosure to those of ordinary skill in the art. In the following description, well-known functions or constructions are not described in detail since they would obscure the disclosure with unnecessary detail. Throughout the specification, like reference numerals in the drawings denote like components.

Throughout the specification, it will also be understood that when an element is referred to as being "connected to" or "coupled with" another element, it may be directly connected to or coupled with the other element, or it may be electrically connected to or coupled with the other element by having an intervening element interposed therebetween. Also, when a part "includes" or "comprises" an element, unless there is a particular description contrary thereto, the part may further include other components, not excluding the other components.

Expressions such as "at least one of," when preceding a list of components, modify the entire list of components and do not modify the individual components of the list.

Throughout the specification, application virtualization indicates that not an actual application is downloaded to a terminal and then the terminal completely executes the application but the application is completely or partially executed by using a resource of an external device and then the terminal receives a result of the execution and provides, to a user, the same or a similar effect of executing the application in the terminal.

For example, a virtualization server may execute an application, and may encode in real-time an image or audio that may be provided to a user during the execution of the application and may convert the image or audio in the form of a streaming file. The virtualization server may transmit the streaming file to a terminal, and the terminal may execute a virtual application by reproducing streaming content.

For example, when the application is moving picture content, the terminal may not reproduce the moving picture content because the resolution of the moving picture content exceeds the reproduction resolution that is supported by the terminal, or the terminal does not have sufficient resources. In this case, a server may receive the moving picture content, may encode the moving picture content with a resolution that is supported by the terminal, and then may transmit the encoded moving picture content to the terminal.

For example, a web browser of the terminal may not render all parts of a webpage but the virtualization server may render the webpage and then may transmit the webpage to the terminal.

For example, the terminal may make the server execute a module of an application that requires lots of resources, may call the module, which is executed by the server, by using a remote procedure call (RPC) method, and then may receive a result of the execution while the application is executed.

In one or more embodiments of the present disclosure, an actual application or an application refers to an application that is downloaded from an application server, and a virtual application refers to a virtualized application that is executed by the terminal.

In one or more embodiments of the present disclosure, the feature of executing the virtual application refers that the actual application is virtualized and then is executed.

FIG. 1 illustrates an application virtualization system according to an embodiment of the present disclosure.

As illustrated in FIG. 1, the application virtualization system includes a terminal 200, an application server 100 storing an application, and a virtualization server 300 virtualizing the application.

The terminal 200 may download the application from the application server 100 and may execute the application. However, when the terminal 200 may not execute the application due to hardware or software problems, or a shortage of resources, the terminal 200 may request the virtualization server 300 for application virtualization.

In response to the request by the terminal 200, the virtualization server 300 may download the application from the application server 100, may execute the application, and may transmit in real-time an output of the executed application to the terminal 200.

The terminal 200 may receive in real-time the output of the executed application from the virtualization server 300 and may virtually execute the application, and may transmit user-manipulation information or terminal status information to the virtualization server 300.

The terminal 200 may be a computer having a media player function, a mobile device having a media player function, or a device such as a TV that may be connected to both wired and wireless networks. The mobile device may include, but is not limited to, portable devices including a mobile phone, a smartphone, a personal digital assistant (PDA), a portable multimedia player (PMP), and a navigation device.

The terminal 200 may be wiredly or wirelessly connected to the application server 100 or the virtualization server 300 and may perform wired or wireless communication according to predetermined rules.

The application server 100 is a server that stores an application and transmits the application to a terminal or an external device, and may indicate a group of application servers. The application server 100 may store not only the application but also store content, such as a moving picture or audio, or a webpage.

The application server 100 may store information about the application and may transmit only the information about the application.

The virtualization server 300 may request the application server 100 for the application and may receive the application from the application server 100. Also, the virtualization server 300 may execute the application and may transmit an output of the executed application to the terminal 200, so that the virtualization server 300 may enable the terminal 200 to execute a virtual application.

The virtualization server 300 may be a system consisting of a plurality of servers that perform functions, respectively. For example, the virtualization server 300 may be divided into an application executing server and a back-end server, wherein the application executing server actually executes the application and transmits a result of the execution to the terminal 200, and the back-end server performs an information transfer between the terminal 200 and the application executing server.

Figure 2A:
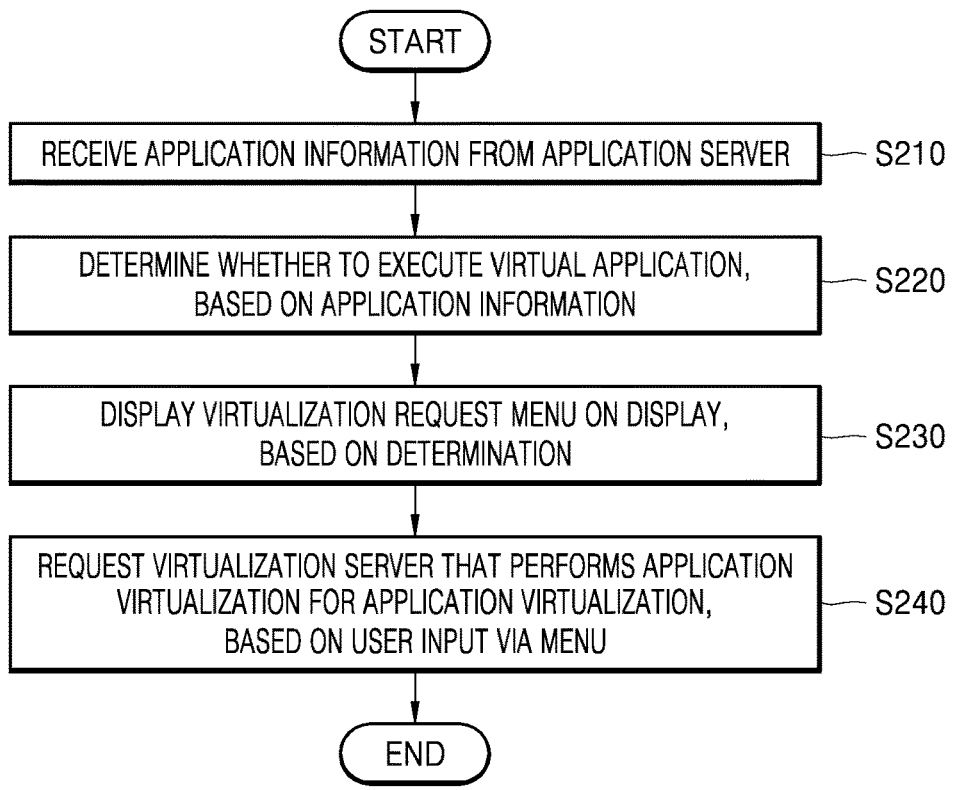
FIG. 2A is a flowchart of a method of executing a virtual application by a terminal, according to an embodiment of the present disclosure.

FIG. 2A is a flowchart of a method of executing a virtual application by the terminal 200, according to an embodiment of the present disclosure.

In operation S210, the terminal 200 receives application information from the application server 100. In operation S220, the terminal 200 determines whether to execute the virtual application based on the application information. For example, after the terminal 200 determines whether an application is executable based on the application information, when the terminal 200 determines that the application is not executable, the terminal 200 determines whether to execute the virtual application. The determination about whether to execute the virtual application may be performed based on whether the virtual application is executable in the terminal 200.

In operation S230, the terminal 200 displays a virtualization request menu on the terminal 200, based on the determination of whether to execute the virtual application.

In operation S240, the terminal 200 requests the virtualization server 300, which performs the application virtualization, for application virtualization, based on a user input via a menu. For example, when a user selects the virtualization request menu, the terminal 200 may request the virtualization server 300 for the application virtualization.

Figure 2B:
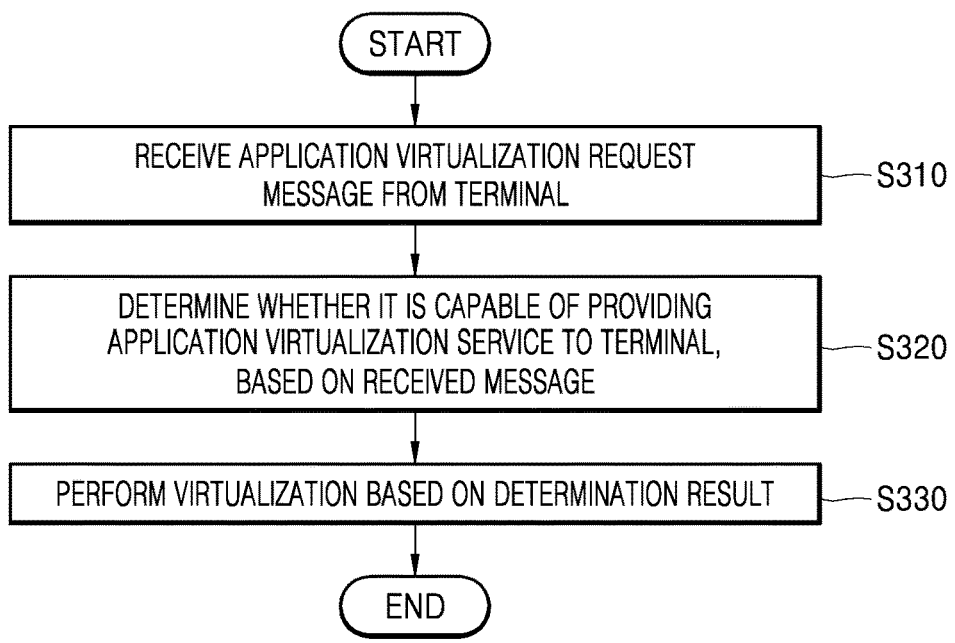
FIG. 2B is a flowchart of a method of performing application virtualization by a virtualization server, according to an embodiment of the present disclosure.

FIG. 2B is a flowchart of a method of performing application virtualization by the virtualization server 300, according to an embodiment of the present disclosure.

In operation S310, the virtualization server 300 receives an application virtualization request message from the terminal 200. In operation S320, the virtualization server 300 determines whether the virtualization server 300 may provide an application virtualization service to the terminal 200, based on the application virtualization request message. In operation S330, when the virtualization server 300 determines that the virtualization server 300 may provide the application virtualization service to the terminal 200, the virtualization server 300 performs the application virtualization.

Figure 3:
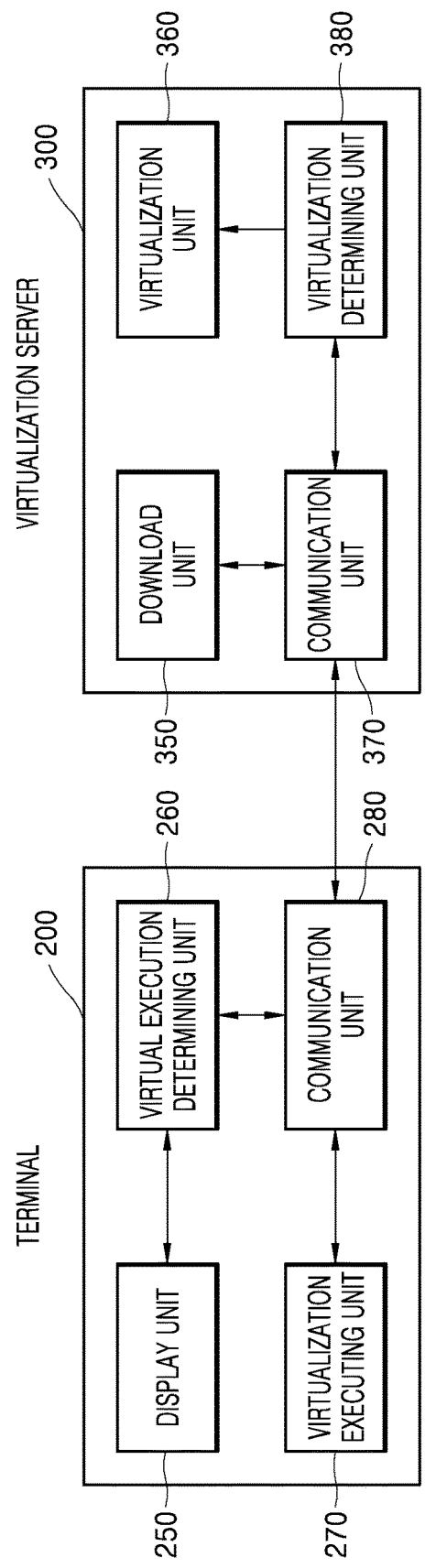
FIG. 3 is a block diagram illustrating the terminal and the virtualization server, according to an embodiment of the present disclosure.

FIG. 3 is a block diagram illustrating the terminal 200 and the virtualization server 300, according to an embodiment of the present disclosure.

Referring to FIG. 3, the terminal 200 may include a display unit 250, a virtual execution determining unit 260, a virtualization executing unit 270, and a communication unit 280.

The communication unit 280 is controlled by the virtual execution determining unit 260 and the virtualization executing unit 270. Also, the communication unit 280 may communicate with the application server 100 and the virtualization server 300 via a wired and/or wireless network.

The virtual execution determining unit 260 determines whether to execute a virtual application in the terminal 200.

The virtual execution determining unit 260 may determine whether a user-selected terminal may be executed by the terminal 200, based on application information, software or hardware specifications, and/or a resource status of the terminal 200, for example.

Also, the virtual execution determining unit 260 may transmit an application virtualization request message to the virtualization server 300, and may receive information from the virtualization server 300. Here, the information is about whether an application virtualization service may be provided from the virtualization server 300.

The virtual execution determining unit 260 may determine whether the terminal 200 may execute the virtual application, based on the information about whether the application virtualization service may be provided from the virtualization server 300, the resource status of the terminal 200, and a status of software or a network for virtualization execution.

The virtualization executing unit 270 requests the virtualization server 300 for application virtualization, processes data after receiving an output of an application that is executed by the virtualization server 300, and provides a result of the processing to a user. Also, the virtualization executing unit 270 transmits information about a user that is input via the terminal 200 and/or about a status of the terminal 200 to the virtualization server 300, for example. The output of the application that is executed by the virtualization server 300 may be data that configures an execution result screen of the application.

For example, when the output of the application that is executed by the virtualization server 300 is transmitted in a streaming form, the virtualization executing unit 270 may receive moving picture(s) streaming from the virtualization server 300 and may reproduce the moving picture streaming. The virtualization executing unit 270 may reproduce video or audio, and may process data according to a streaming protocol, such as the Hyper Text Transfer Protocol (HTTP), the Real Time Streaming Protocol (RTSP)/the Real-time Transport Protocol (RTP), or the like.

Also, the virtualization executing unit 270 may receive information, such as vibration or an alarm sound, in addition to the moving picture streaming, from the virtualization server 300, and may provide the information to a user of the terminal 200. The virtualization executing unit 270 may transmit user-manipulation information or terminal status information, such as a battery status, to the virtualization server 300. That is, when the virtualization executing unit 270 receives an event from an operating system (OS), the virtualization executing unit 270 may transmit information about the event to the virtualization server 300.

The display unit 250 may provide, to the user, an application execution screen and a user interface (UI) for manipulation of the application.

Referring to FIG. 3, the virtualization server 300 may include a download unit 350, a virtualization unit 360, a communication unit 370, and a virtualization determining unit 380.

The communication unit 370 is controlled by the download unit 350, the virtualization unit 360, and the virtualization determining unit 380. The communication unit 370 may communicate with the application server 100 and the terminal 200 via a wired and/or wireless network.

The virtualization determining unit 380 determines whether the virtualization server 300 may provide an application virtualization service to the terminal 200, based on an application virtualization request message that is transmitted from the terminal 200. The application virtualization request message that is transmitted from the terminal 200 will be described later with reference to FIG. 5.

The download unit 350 downloads an application from the application server 100. Also, the download unit 350 may determine whether the application already exists in the virtualization server 300, and if not, the download unit 350 may request the application server 100 for the application.

The virtualization unit 360 may execute the application that is downloaded from the application server 100, and may operate in conjunction with the terminal 200 so that a virtual application may be executed by the terminal 200.

A type of the application that is executable in the virtualization unit 360 is not limited. That is, the virtualization unit 360 may execute not only an application that is executable in the terminal 200 but also execute an application that is not executable in the terminal 200 due to an insufficient function of hardware or software of the terminal 200 that requests virtualization. Also, the virtualization unit 360 may execute not only an application, such as a game, but also execute data such as moving picture content or audio content.

The virtualization unit 360 may include various types of hardware, software platforms, or virtual machines so as to execute various applications downloaded from the application server 100.

For example, when an application that is downloaded from the application server 100 is optimized for a Gingerbread version of an Android platform, the virtualization unit 360 may actually drive the application by using a gingerbread platform virtual machine included in the virtualization unit 360.

For example, if a three-dimensional (3D) graphic accelerator is required to drive an application, the virtualization unit 360 may include an actual 3D graphic accelerator or may include software capable of replacing the 3D graphic accelerator.

The virtualization unit 360 may encode in real-time video or audio that may be provided to a user during execution of an application and may transmit the video or audio in a streaming form to the terminal 200.

For example, the virtualization unit 360 may include various types of codecs, such as MPEG, H.264, or the like, so as to perform video and audio encoding. Also, the virtualization unit 360 may support various streaming protocols, such as RTP/RTSP, Adaptive HTTP, or the like.

For example, the virtualization unit 360 may adaptively change an encoding speed and a transmission speed according to a network status between the terminal 200 and the virtualization server 300 or a screen change speed in an application that is executed by the virtualization unit 360.

When the virtualized application is a web application, the virtualization unit 360 may render a webpage, and then may transmit it to the terminal 200.

The virtualization unit 360 may transmit, to the terminal 200, the information, such as vibration or an alarm sound, which is provided to a user during the execution of the application.

The virtualization unit 360 may receive, from the terminal 200, the information about user input or terminal status, and may apply the information to the application that is being executed.

Figure 4:
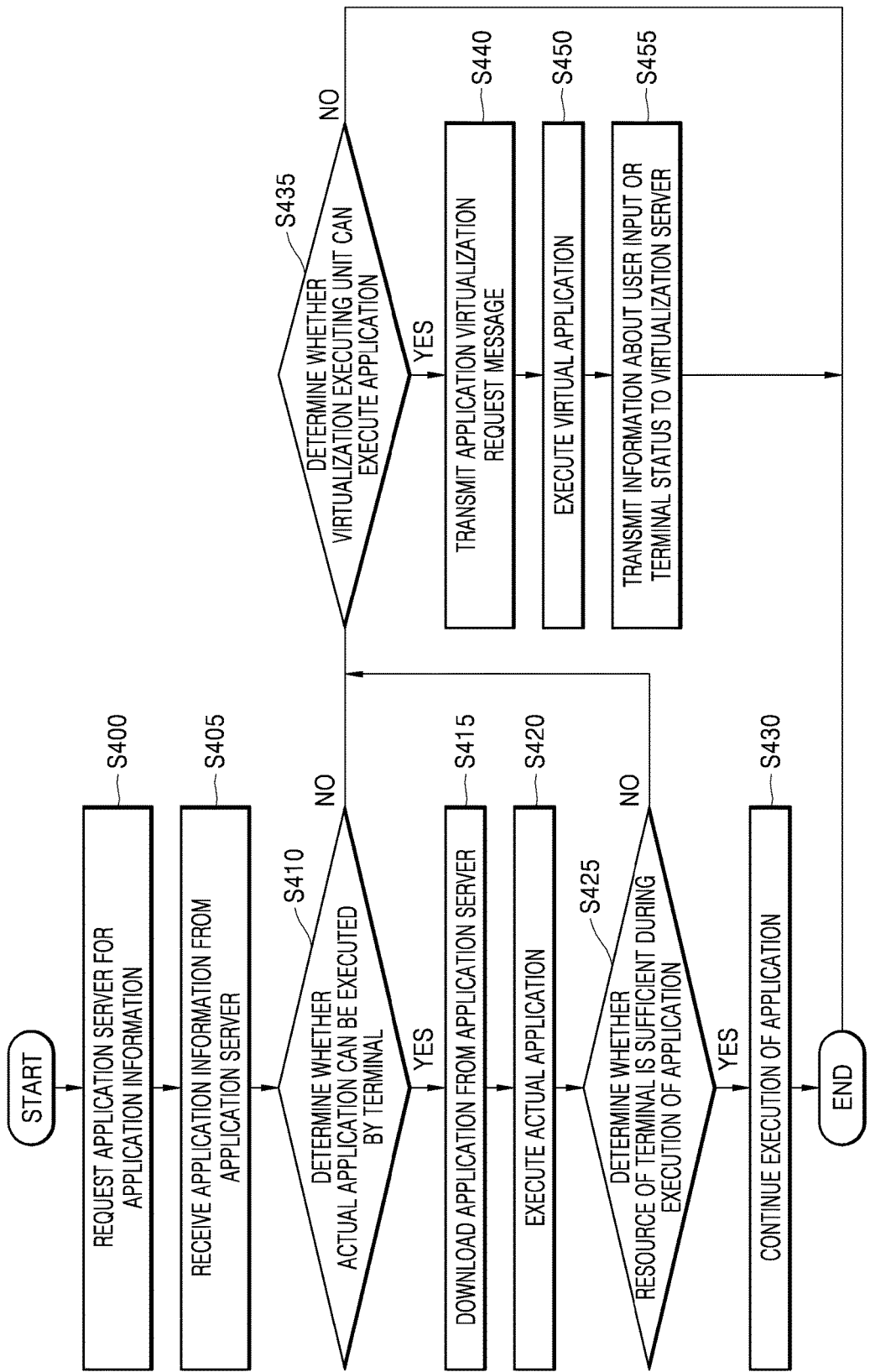
FIG. 4 is a flowchart of a method of executing a virtual application by the terminal, according to another embodiment of the present disclosure.

FIG. 4 is a flowchart of a method of executing a virtual application by the terminal 200, according to another embodiment of the present disclosure.

In operation S400, when a user selects an application in the terminal 200, the terminal 200 requests the application server 100 for information about the application.

In operation S405, the terminal 200 receives the information about the application from the application server 100. The information that is received from the application server 100 may include for example, a size of the application, a storage capacity for execution of the application, information about an OS to drive the application, and/or hardware or software information for execution of the application. Also, the information from the application server 100 may include resource information about a recommended performance for a central processing unit (CPU) or random-access memory (RAM). Also, the information from the application server 100 may include identification (ID) or a uniform resource locator (URL) of a server from which the virtualization server 300 may download the application.

Also, the information from the application server 100 may include information about whether the application that is requested by the virtualization server 300 may be virtualized. In this case, the application server 100 may previously store information about possibility of application virtualization, and may include access information, such as a URL of the virtualization server 300.

In operation S410, the terminal 200 determines whether the application is executable, based on the received information about the application, and information about software, hardware, or a resource of the terminal 200.

For example, when an OS platform of the application is iOS, and an OS platform of the terminal 200 is Android, the terminal 200 may determine that the application is not executable. Also, if a specific software library is required to execute the application, the terminal 200 may determine that the application is not executable.

For example, when the application requires a CPU performance, a graphic processing unit (GPU) performance, a RAM capacity, a data storage capacity, and display resolution that exceed a predetermined level, or requires a 3D graphic accelerator, while the terminal 200 does not have such hardware performance, the terminal 200 may determine that the application is not executable.

For example, although a hardware performance of the terminal 200 is sufficient for execution of the application, when resources of the terminal are insufficient for execution of the application because another application is executed, the terminal 200 may determine that the application is not executable.

In operation S410, when the terminal 200 determines that the application is not executable, in operation S435, the terminal 200 may determine whether the virtualization executing unit 270 is capable of executing a virtual application in the terminal 200.

The virtualization executing unit 270 may be a streaming player, and when a resource to execute the virtualization executing unit 270 is insufficient, the terminal 200 may determine that the virtualization executing unit 270 is not capable. When the virtualization executing unit 270 is not capable, the terminal 200 does not execute and ends the application.

In operation S435, when the terminal 200 determines that the virtual application is executable, in operation S440, the terminal 200 transmits an application virtualization request message to the virtualization server 300, and requests application virtualization.

In operation S450, the terminal 200 executes the virtual application.

For example, an output of the application that is executed by the virtualization server 300 and which is transmitted from the virtualization server 300 to the terminal 200 may be information, such as video, audio, vibration, or the like, that may be provided to a user during the execution of the application. Alternatively, the output of the application may be streaming content obtained by encoding the video and audio in real-time. In this case, the execution of the virtual application corresponds to conjunction including reproduction of the streaming content between the terminal 200 and the virtualization server 300.

For example, when only a module that uses many resources during execution of an application is separately in the virtualization server 300, the execution of the virtual application corresponds to conjunction between a module that is executed by the terminal 200 and a module that is executed by the virtualization server 300. In this case, the output of the application that is executed by the virtualization server 300 may be transmitted to the terminal 200 by using an RPC method, not a streaming method, and a result of the output may be an object, not streaming content.

In operation S455, the terminal 200 transmits the information about user input or terminal status to the virtualization server 300. That is, the user input from an OS of the terminal 200 to the virtualization executing unit 270 of the terminal 200, or events according to a change in the status of the terminal 200 are transmitted to the virtualization server 300.

An order of operations S450 and S455 may be changed, and operation S455 may be included in operation S450.

In operation S410, when the terminal 200 determines that the application is executable, in operation S415, the terminal 200 downloads the application from the application server 100.

In operation S420, the terminal 200 executes the downloaded application.

In operation S425, after the terminal 200 executes the application, the terminal 200 determines whether resources are sufficient for the application to normally operate in the terminal 200. When the terminal 200 determines that the resources are not sufficient, the terminal 200 determines whether the virtual application is executable in the terminal 200, and requests the virtualization server 300 to virtualize the application.

When the resources of the terminal 200 are sufficient for execution of the application, in operation S430, the terminal 200 continues execution of the application.

Although not illustrated in FIG. 4, when the terminal 200 executes the virtual application, user's application usage information, including items or ranking information of a user, may be stored in a storage unit (not shown) of the virtualization server 300 or the terminal 200. Afterward, when the user attempts to execute the application again, the terminal 200 may update user information by using the stored application usage information.

Although not illustrated in FIG. 4, when the terminal 200 executes the virtual application, the terminal 200 may store streaming information received from the virtualization server 300. For example, the terminal 200 may execute the virtual application and may simultaneously record the streaming information.

Figure 5A:
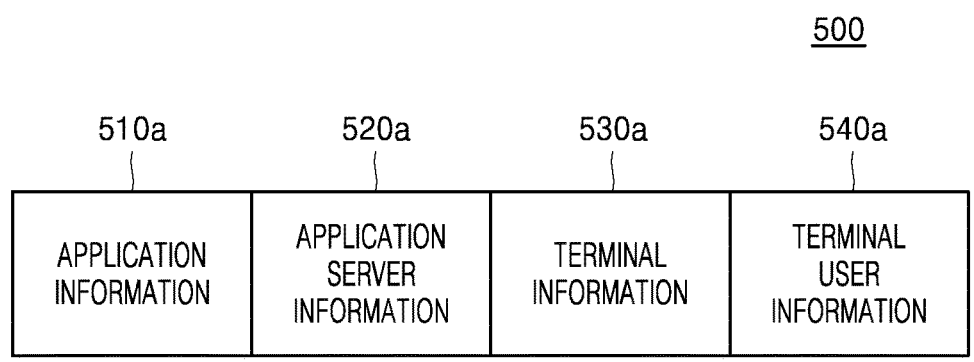
FIG. 5A illustrates a part of an application virtualization request message that is transmitted by the terminal so as to request the virtualization server for application virtualization, according to an embodiment of the present disclosure.

FIG. 5A illustrates a part of an application virtualization request message 500 that is transmitted by the terminal 200 so as to request the virtualization server 300 for application virtualization, according to an embodiment of the present disclosure.

Referring to FIG. 5A, the application virtualization request message 500 that is transmitted for the application virtualization may include application information 510a, application server information 520a, terminal information 530a, and terminal user information 540a.

The application information 510a indicates information about an application that the terminal 200 attempts to execute.

The application information 510a may include a unique ID or a URL of the application. Also, the application information 510a may include, but is not limited to, application size information, hardware information required in execution of the application, environment information for execution of the application, a lowest platform version for execution of the application, an OS version for execution of the application, and a recommended resource for execution of the application.

Also, the application information 510a may be about the application to be virtualized. The application information 510a may be used when the terminal 200 determines the capability of executing the application, and may be used when the virtualization server 300 determines whether the virtualization server 300 may provide an application virtualization service to the terminal 200. Also, the application information 510a may be used when the virtualization server 300 sets a virtual machine required for the execution of the application.

The application server information 520a may be information about the application server 100 from which the terminal 200 or the virtualization server 300 may download the application. The information about the application server 100 may be an ID or URL of the application server 100, for example.

However, in a case where an application ID included in the application information 510a has a URL form such that it is not capable of extracting the information about the application server 100 from the application information 510a, the application server information 520a may not exist.

The terminal information 530a is about the terminal 200 that requests the virtualization server 300 for the application virtualization. The terminal information 530a may indicate the resolution of the terminal 200, or a type and version of firmware. Also, the terminal information 530a may be information about a virtual application player, such as version information of a streaming player, available codec information, or an available streaming protocol.

The terminal information 530a may be used by the virtualization server 300 to determine an encoding method when the virtualization server 300 executes the application and streaming-encodes an execution result.

The terminal user information 540a is about a user of the terminal 200 that requests the application virtualization. For example, the terminal user information 540a may include, but is not limited to, an ID or password of the user.

The terminal user information 540a may be used by the virtualization server 300 to authenticate the user.

FIG. 5B illustrates an application virtualization request message that is generated by Extensible Markup Language (XML), according to an embodiment of the present disclosure. 510b illustrates application information 510a, 520b illustrates application server information 520a, 530b illustrates terminal information 530a, and 540b illustrates terminal user information 540a in XML form.

Figure 6:
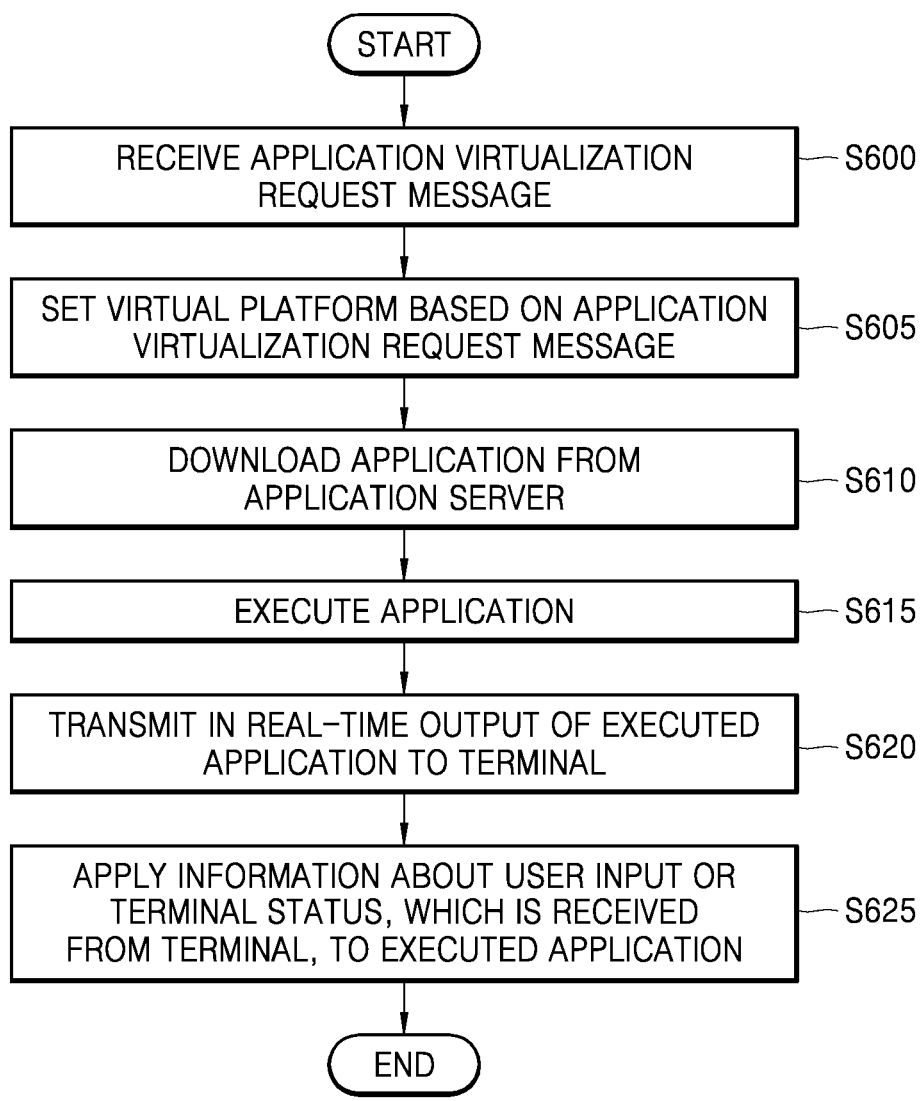
FIG. 6 is a flowchart of a method of performing application virtualization by the virtualization server, according to another embodiment of the present disclosure.

FIG. 6 is a flowchart of a method of performing application virtualization by the virtualization server 300, according to another embodiment of the present disclosure.

In operation S600, the virtualization server 300 receives the application virtualization request message 500 from the terminal 200. The application virtualization request message 500 is described with reference to FIGS. 5A and 5B.

In operation S605, the virtualization server 300 may set hardware, firmware, an OS, a software platform, or the like that may be required for execution of an application, based on the application information 510a that is transmitted from the terminal 200 or application information that is directly transmitted from the application server 100.

For example, when the application operates in a terminal having a motion sensor, the virtualization server 300 may set software capable of receiving information from the terminal 200 and inputting the information into the executed application Here, the information is about a motion that a user inputs into the terminal 200, for example.

For example, when the application requires firmware that is equal to or higher than a predetermined version, or operates in an OS that is equal to or higher than a specific version, the virtualization server 300 may set the requested firmware or OS.

In operation S610, the virtualization server 300 downloads the application from the application server 100 based on the application server information 520a and the application information 510a. For example, the virtualization server 300 may access a URL or ID of the application server 100 or a URL of the application and then may download the application.

In operation S615, the virtualization server 300 executes the application.

In operation S620, the virtualization server 300 transmits an output of the executed application to the terminal 200 in real-time.

For example, when the output of the executed application is streaming-encoded, the virtualization server 300 may encode in real-time the output such as video or audio according to a code, a streaming protocol, and resolution that are supported by the terminal 200 based on the terminal information 530a, and may transmit the output to the terminal 200. During the execution of the application, not only information of the video or audio but also information of vibration may be encoded according to a specific protocol and may be transmitted to the terminal 200.

Also, when only a module that uses many resources during the execution of the application is executed by the virtualization server 300, a result of the execution may be transmitted to the terminal 200 by using an RPC method.

In operation S625, the virtualization server 300 may apply information about user input or terminal status, which is received from the terminal 200, to the executed application. For example, when the user inputs a touch or a key during the execution of the application, or when the application may be ended due to a low battery capacity, the virtualization server 300 may receive such information from the terminal 200 and may apply the information to the executed application.

An order of operations S620 and S625 may be changed, and operations S620 and S625 may be repeated while the application is virtualized.

Figure 7:
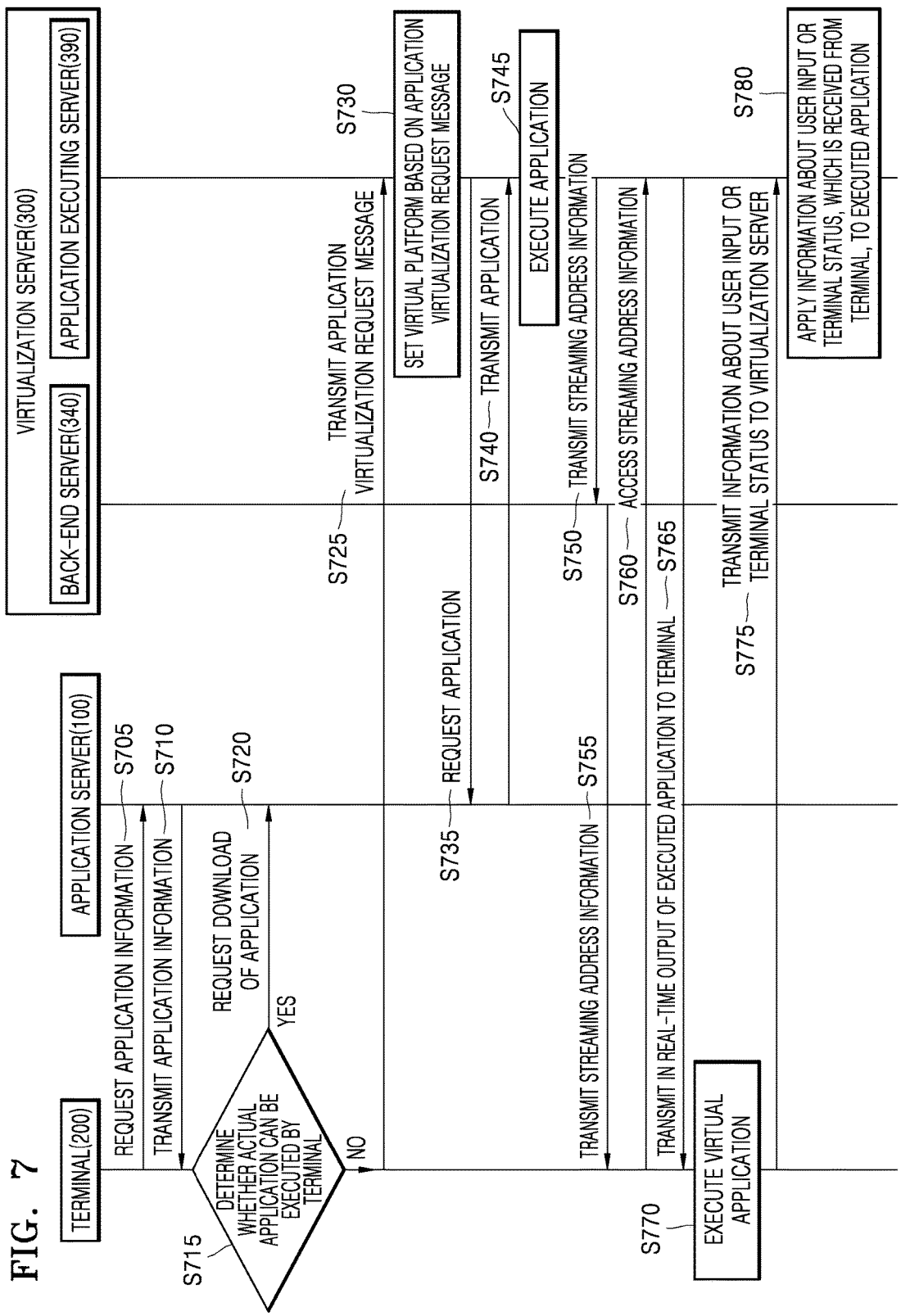
FIG. 7 is a flowchart of a method of executing a virtual application by the terminal, wherein the flowchart illustrates operations between the application server, the terminal, and the virtualization server, according to an embodiment of the present disclosure.

FIG. 7 is a flowchart of a method of executing a virtual application by the terminal 200, which illustrates operations between the application server 100, the terminal 200, and the virtualization server 300, according to an embodiment of the present disclosure.

As described above, the virtualization server 300 may be divided into a back-end server 340 and an application executing server 390.

In operation S705, the terminal 200 requests the application server 100 for application information. The request of the application information may be a part of an application download request. In operation S710, the application server 100 transmits, to the terminal 200, the application information about a requested application. The application information may include, but is not limited to, an application storage capacity, the performance of hardware and software required for execution of the application, a recommended resource, an ID and URL of the application server 100, and virtualization capability by the virtualization server 300.

Operations S705 and S710 are processes of receiving the application information from the application server 100, and correspond to operations S400 and S405 shown in FIG. 4.

In operation S715, the terminal 200 determines whether the terminal 200 may execute the application. The determination about the capability to execute the application is described above in operation S410.

In operation S720, when the terminal 200 determines that the terminal 200 may execute the application, the terminal 200 requests the application server 100 for a download of an application and downloads the application from the application server 100. In operation S725, when the terminal 200 determines that the terminal 200 may not execute the application, the terminal 200 transmits the application virtualization request message 500 to the virtualization server 300 and requests application virtualization.

In another embodiment, when the terminal 200 determines that the terminal 200 may not execute the application, the terminal 200 may transmit the application virtualization request message 500 to the virtualization server 300 only when the terminal 200 receives a user input with respect to the application virtualization.

In operation S725, the terminal 200 transmits the application virtualization request message 500 to the application executing server 390, and requests the application virtualization. The application virtualization request message 500 is described above with reference to FIG. 5.

In operation S730, the application executing server 390 may set a virtual platform required for execution of the application, based on the application information 510*a* that is included in the application virtualization request message 500 received from the terminal 200.

In operation S735, the application executing server 390 requests the application server 100 for the application. An URL of the application server 100 may be included in the application information 510*a* or the application server information 520*a*, which is received from the terminal 200.

In operation S740, the virtualization server 300 downloads the application from the application server 100.

In operation S745, the application executing server 390 executes the application.

In operation S750, the application executing server 390 transmits a streaming address to the back-end server 340, and in operation S755, the back-end server 340 transmits the streaming address to the terminal 200.

In operation S760, the terminal 200 accesses the application executing server 390 so as to receive a stream. A setting of the streaming address corresponds to preparation for streaming between the terminal 200 and the application executing server 390, and may be changed according to a streaming protocol. Also, before the virtualization server 300 executes the application (operation S745), the preparation to stream may be performed in operations S750 and S760.

In operation S765, the application executing server 390 transmits an output of the executed application to the terminal 200 in real-time.

In operation S770, the terminal 200 executes a virtual application. The execution of the virtual application may refers that the terminal 200 receives the stream from the application executing server 390 and then reproduces streaming content.

In operation S775, the terminal 200 transmits information about user input or terminal status to the application executing server 390 during the execution of the virtual application. In addition to the information about user input or terminal status, when the application is actually executed by the terminal 200, events that are supposed to be transmitted to the application may also be transmitted to the application executing server 390.

The information about user input or terminal status may be transmitted by using a protocol that is particularly set by the terminal 200 and the application executing server 390.

In operation S780, the application executing server 390 applies the information about user input or terminal status to the executed application. Afterward, an output of the executed application is transmitted to the terminal 200.

Although not illustrated in FIG. 7, when the virtual application is ended, user information about the execution of the application may be stored in the terminal 200 or the virtualization server 300.

Figure 8:
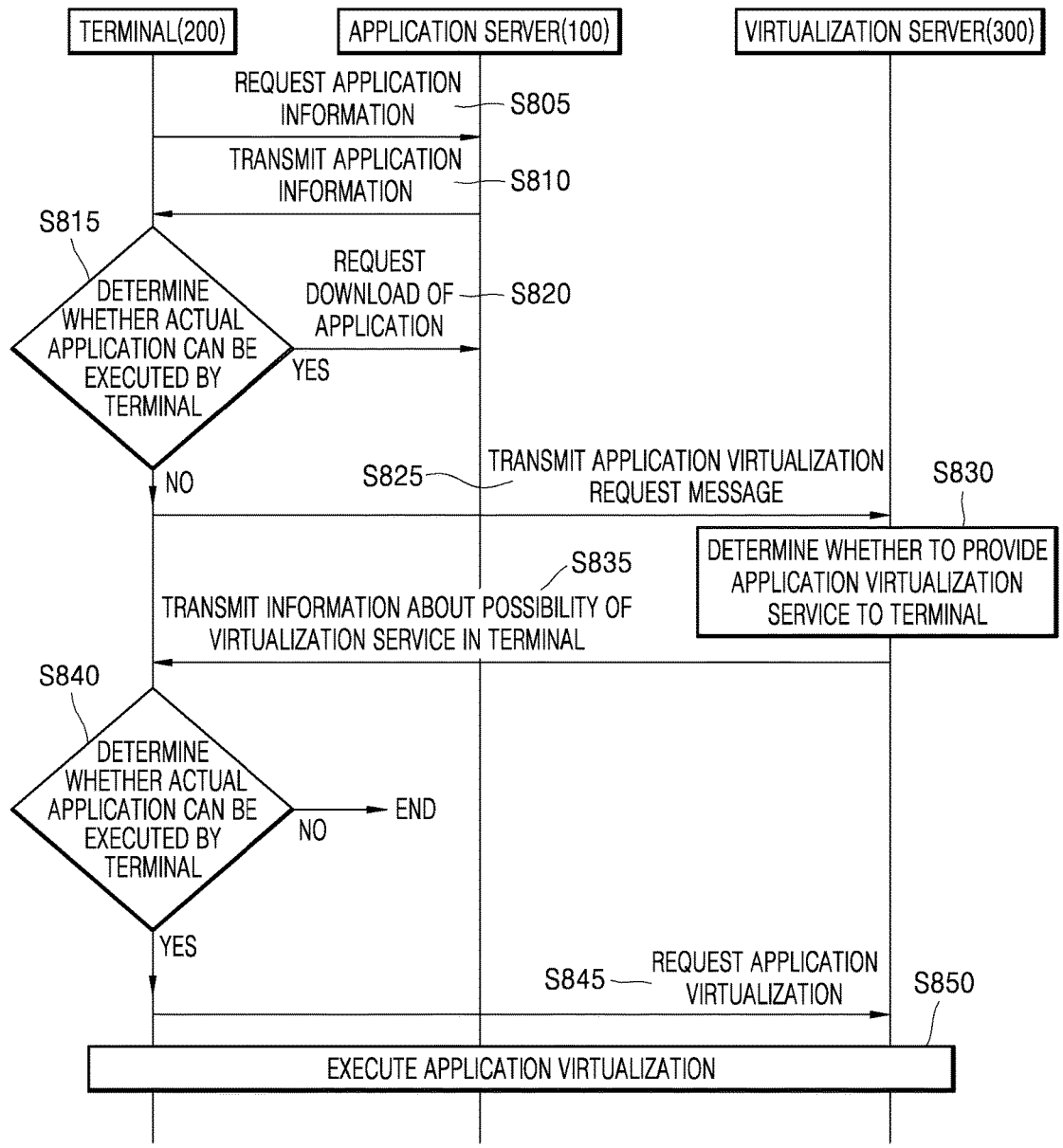
FIG. 8 is a flowchart of a method of executing a virtual application by the terminal, wherein the flowchart illustrates operations between the application server, the terminal, and the virtualization server, according to another embodiment of the present disclosure.

FIG. 8 is a flowchart of a method of executing a virtual application by the terminal 200, which illustrates operations between the application server 100, the terminal 200, and the virtualization server 300, according to another embodiment of the present disclosure.

Operations S805 through S820 are performed by the terminal 200 so as to determine whether the terminal 200 may execute an actual application, based on application information, and correspond to operations S705 through S720 shown in FIG. 7.

In operation S825, the terminal 200 transmits the application virtualization request message 500 to the virtualization server 300.

In operation S830, the virtualization server 300 determines whether to provide an application virtualization service to the terminal 200.

The virtualization server 300 may determine whether to provide the application virtualization service, based on the terminal user information 540*a*.

For example, when the application virtualization service is a paid service, the virtualization server 300 may determine whether to provide the application virtualization service, based on a user ID of the terminal user information 540*a*. Also, when a user of the terminal 200 is a minor, the virtualization server 300 may not provide an application virtualization service for adults.

The virtualization server 300 may determine whether to provide the application virtualization service, based on the application information 510*a*.

For example, as a result of the determination based on the application information 510*a*, when the virtualization server 300 determines that the virtualization server 300 may not execute the application because the virtualization server 300 does not have a platform that is required for execution of the application or does not have a virtual machine that may replace hardware for execution of the application, the virtualization server 300 may determine that the virtualization server 300 may not provide the application virtualization service.

In operation S835, the virtualization server 300 transmits, to the terminal 200, information about a possibility of the application virtualization service which is determined in operation S830.

In operation S840, the terminal 200 determines whether the terminal 200 may execute the virtual application. The determination about whether the terminal 200 may execute the virtual application may be performed based on whether the virtualization server 300 may perform application virtualization, hardware information of the terminal 200, software information of the terminal 200, a resource status, and/or a network status, for example.

For example, in operation S835, when the terminal 200 receives, from the virtualization server 300, information indicating that the application virtualization is not capable of being performed due to an absence of the virtual machine for execution of the application, the terminal 200 may determine that the terminal 200 may not execute the virtual application and then may end the execution of the application. Also, when the terminal 200 receives information indicating that the application virtualization service may not be provided because a terminal user is not an authenticated user, the terminal 200 may determine that the terminal 200 may not execute the virtual application.

For example, when the application that is requested by the terminal 200 may be virtualized in the virtualization server 300 but the terminal 200 may not reproduce streaming content, or when the terminal 200 may not normally perform reproduction of streaming content because the network status is equal to or lower than a reference level, the terminal 200 may end the virtual application without executing it.

In another embodiment, in operation S815, when the execution of the application is not capable, the terminal 200 may not transmit the application virtualization request message 500 to the virtualization server 300 and may directly determine whether the terminal 200 may execute the virtual application. In this case, the terminal 200 may perform the determination based on a resource status of the terminal 200, whether the terminal 200 has software for execution of the virtual application, or information about the network status.

In operation S840, when the terminal 200 determines that the terminal 200 may execute the virtual application, in operation S845, the terminal 200 requests the virtualization server 300 for application virtualization.

In another embodiment, when the terminal 200 determines that the terminal 200 may execute the virtual application, the terminal 200 may transmit the application virtualization request message 500 to the virtualization server 300 only when the terminal 200 receives a user input with respect to an application virtualization request.

In operation S850, the terminal 200 executes the virtual application, in conjunction with the application server 100 and the virtualization server 300. Operation S850 may correspond to operations S730 through S780, respectively as shown in FIG. 7, therefore, the details have been omitted.

Figure 9:
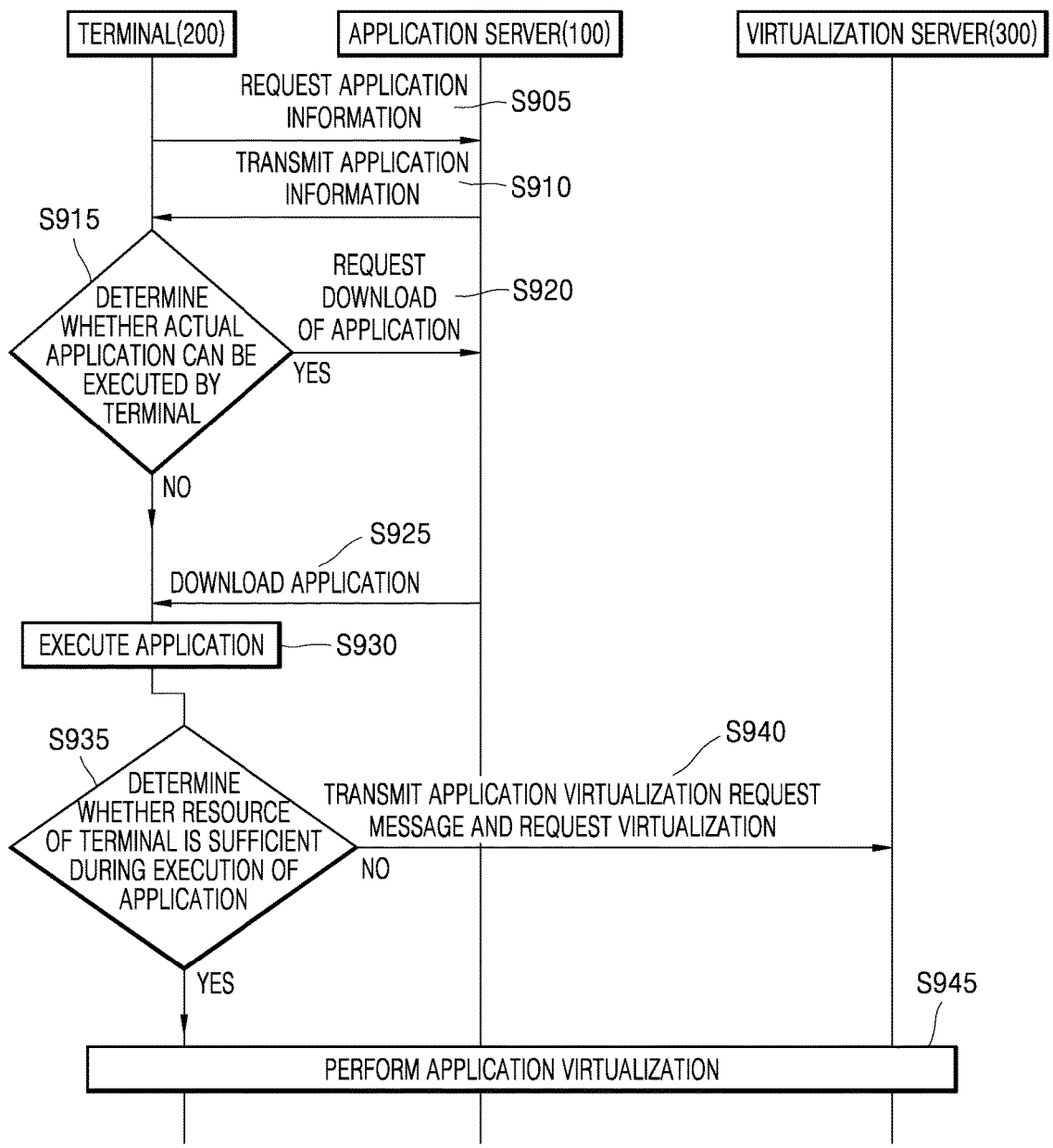
FIG. 9 is a flowchart of a method of executing a virtual application by the terminal, wherein the flowchart illustrates operations between the application server, the terminal, and the virtualization server, according to another embodiment of the present disclosure.

FIG. 9 is a flowchart of a method of executing a virtual application by the terminal 200, wherein the flowchart illustrates operations between the application server 100, the terminal 200, and the virtualization server 300, according to another embodiment of the present disclosure.

Operations S905 through S920 correspond to operations S705 through S720, respectively, as shown in FIG. 7, therefore, the details have been omitted.

In operation S915, when the terminal 200 determines that the terminal 200 may execute an application, in operation S925, the terminal 200 downloads the application from the application server 100.

In operation S930, the terminal 200 executes the downloaded application.

In operation S935, while the downloaded application is executed, the terminal 200 determines whether a resource of the terminal 200 is insufficient. The terminal 200 may include a separate module capable of constantly monitoring a resource status of the terminal 200.

In operation S935, when the terminal 200 determines that the execution of the application is not normally performed due to the insufficient resource of the terminal 200, or the like, in operation S940, the terminal 200 may transmit the application virtualization request message 500 and a virtualization request to the virtualization server 300.

In another embodiment, in operation S935, although the terminal 200 determines that the execution of the application is not normally performed due to the insufficient resource of the terminal 200, or the like, the terminal 200 may request the virtualization server 300 for application virtualization only when the terminal 200 receives a user input with respect to the application virtualization.

In operations including operation S945 after operation S940, the terminal 200 executes the virtual application, in conjunction with the application server 100 and the virtualization server 300. The operations may correspond to operations after operation S725 shown in FIG. 7 or operation S825 shown in FIG. 8, and therefore the details have been omitted.

Although not illustrated in FIG. 9, while the virtual application is executed, when the execution of the virtual application is not smooth due to deterioration in a communication speed of a network or an overload of a server, or when a resource of the terminal 200 becomes sufficient for execution of the application, the terminal 200 may be converted from an application virtualization mode to an actual application execution mode.

Figure 10:
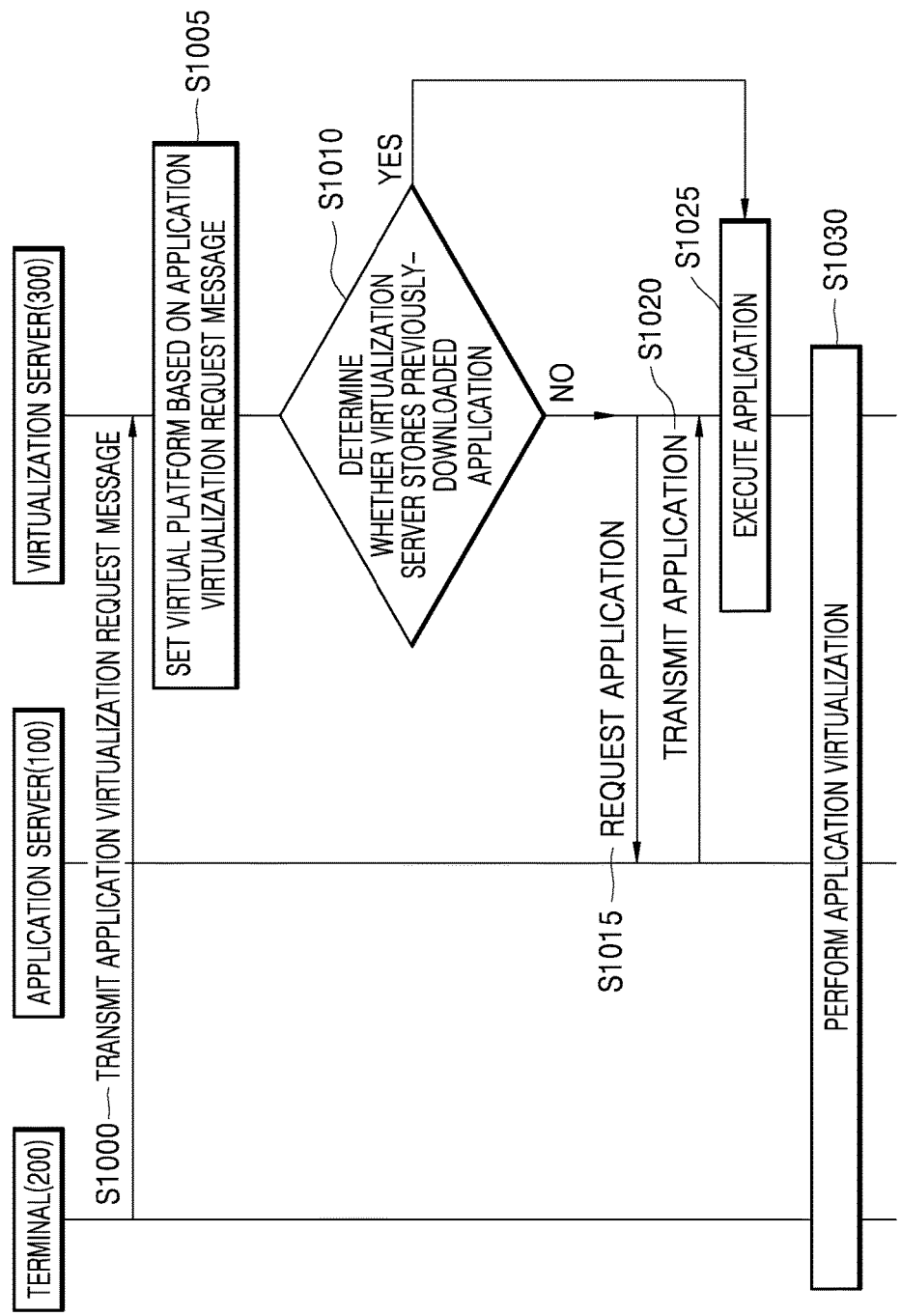
FIG. 10 is a flowchart illustrating operations in which the virtualization server virtualizes an application, according to an embodiment of the present disclosure.

FIG. 10 is a flowchart illustrating operations in which the virtualization server 300 virtualizes an application, according to an embodiment of the present disclosure.

In operation S1000, the virtualization server 300 receives the application virtualization request message 500 and a virtualization request from the terminal 200. Operation S1000 may correspond to operation S725 shown in FIG. 7 or operation S845 shown in FIG. 8, and therefore the details have been omitted.

In operation S1005, the virtualization server 300 sets a virtual platform required for execution of the application. Operation S1005 may correspond to operation S605 shown in FIG. 6.

In operation S1010, the virtualization server 300 determines whether the requested application is already stored in the virtualization server 300. An application that was virtualized more than once may be stored in a storage unit (not shown) of the virtualization server 300. Thus, when the requested application is stored in the storage unit of the virtualization server 300, the virtualization server 300 may not download the application from the application server 100.

In operation S1010, when the requested application is not stored in the storage unit of the virtualization server 300, in operation S1015, the virtualization server 300 requests the application server 100 for the application, and in operation S1020, the virtualization server 300 downloads the application.

In operation S1010, when the requested application is stored in the storage unit of the virtualization server 300, in operation S1025, the virtualization server 300 executes the stored application.

Operation S1030 may correspond to operation S725 shown in FIG. 7 or operation S825 shown in FIG. 8, and therefore the details have been omitted.

FIGS. 11A through 11D illustrate UIs that are changed in the terminal 200 based on a possibility of application virtualization, according to an embodiment of the present disclosure.

Figure 11A:
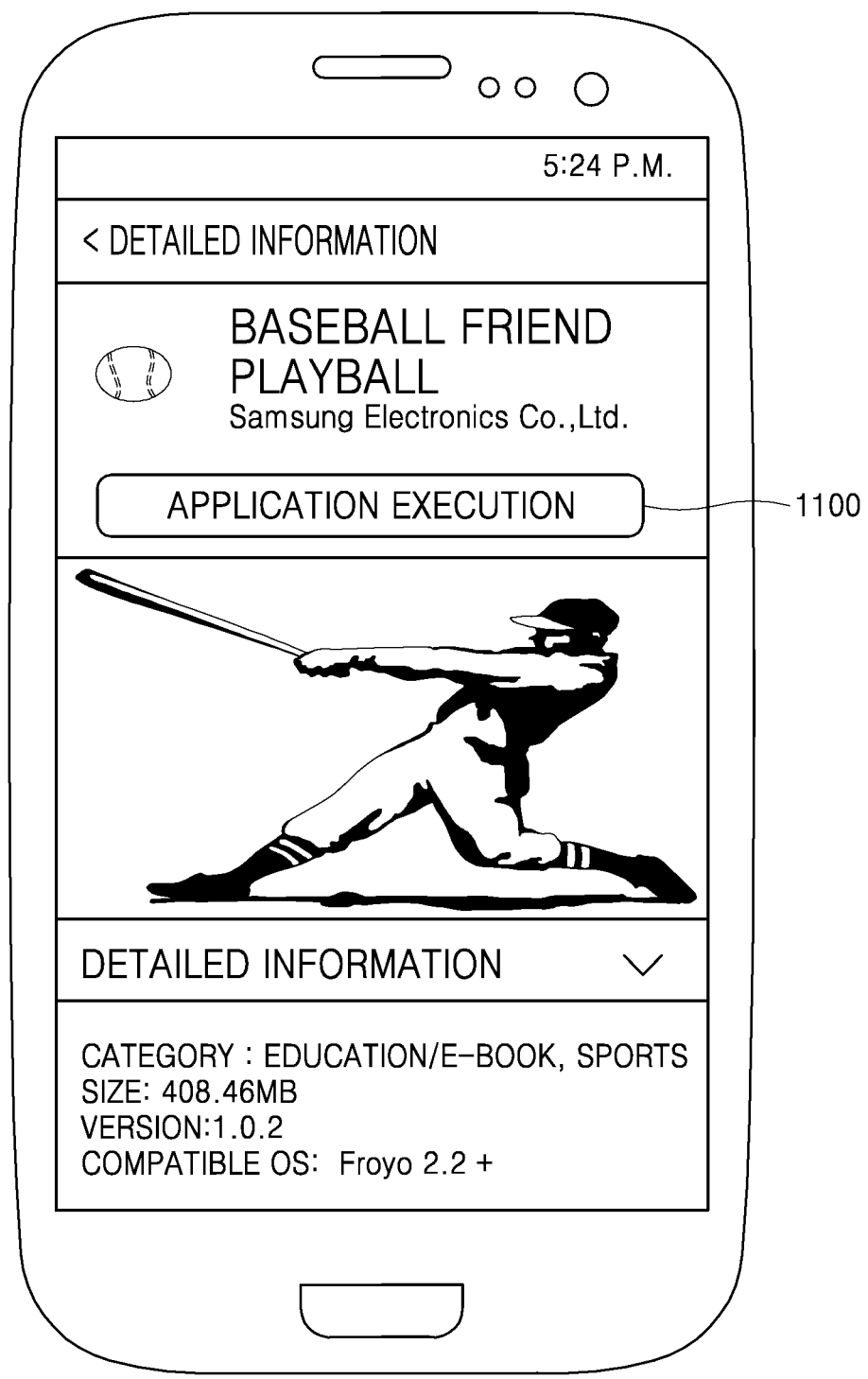
FIGS. 11A through 11D illustrate user interfaces (UIs) that are changed in the terminal based on a possibility of application virtualization, according to an embodiment of the present disclosure.

In FIG. 11A, an application execution 1100 is a UI that is selected by a user so as to execute an application in the terminal 200. When the user selects the application execution 1100, as described above, the terminal 200 may determine whether to execute the application by downloading the application from the application server 100 based on application information, terminal information, and/or network information, or whether to execute a virtual application by requesting the virtualization server 300 for the virtual application, and then may execute the application. In this case, the terminal 200 may automatically select an application execution method that is appropriate for a current situation.

Figure 11B:
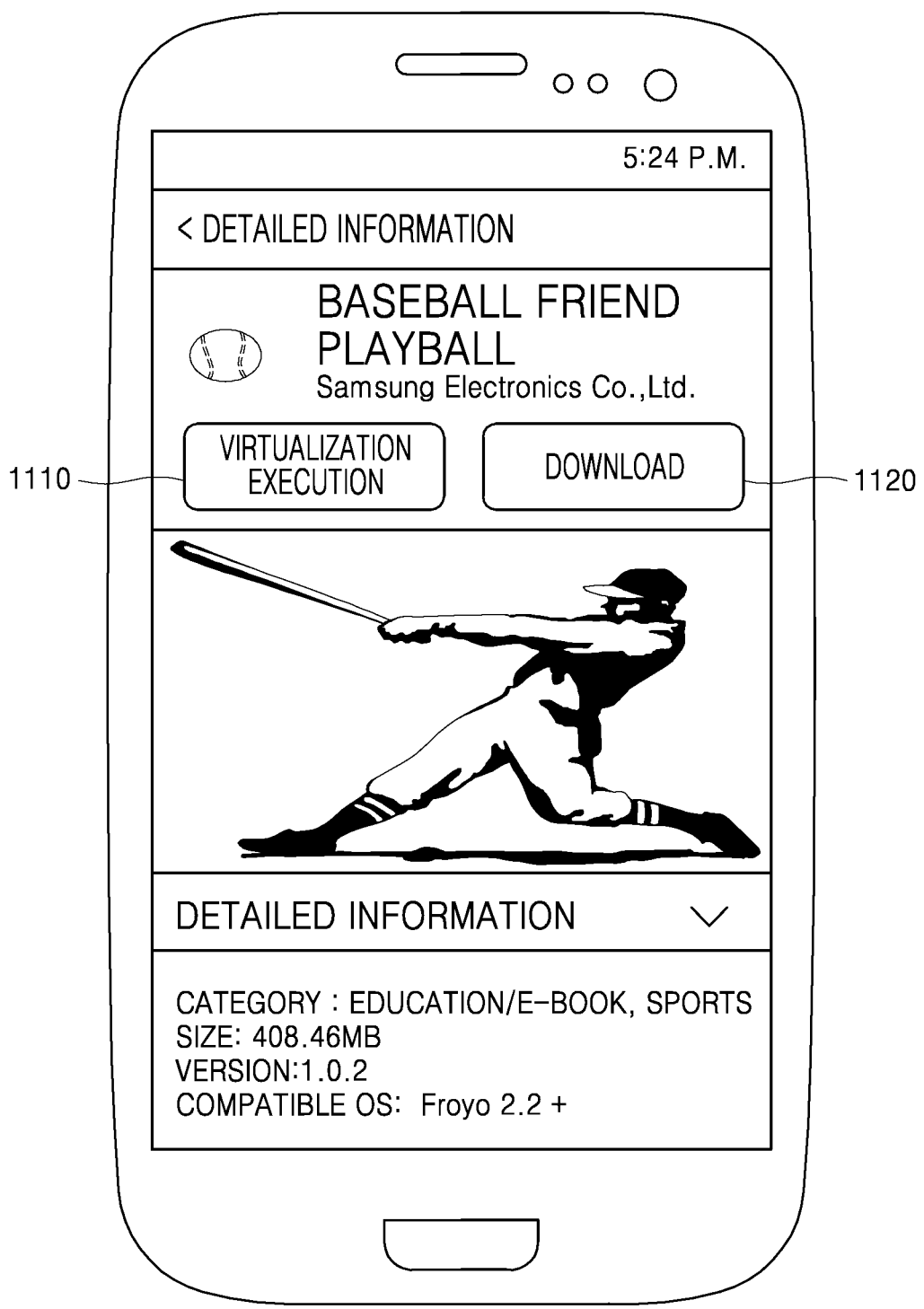
Figure 11C:
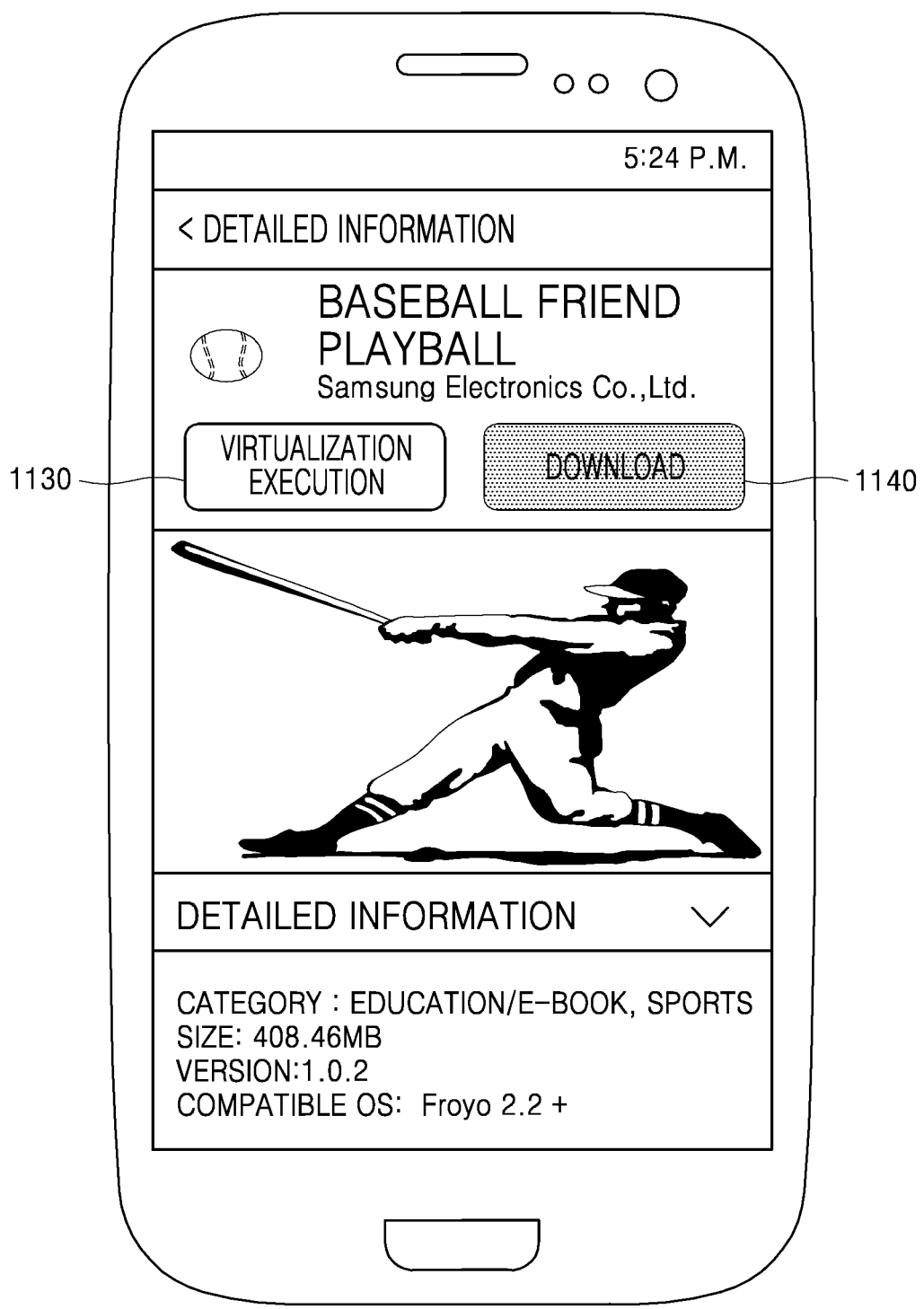
Figure 11D:
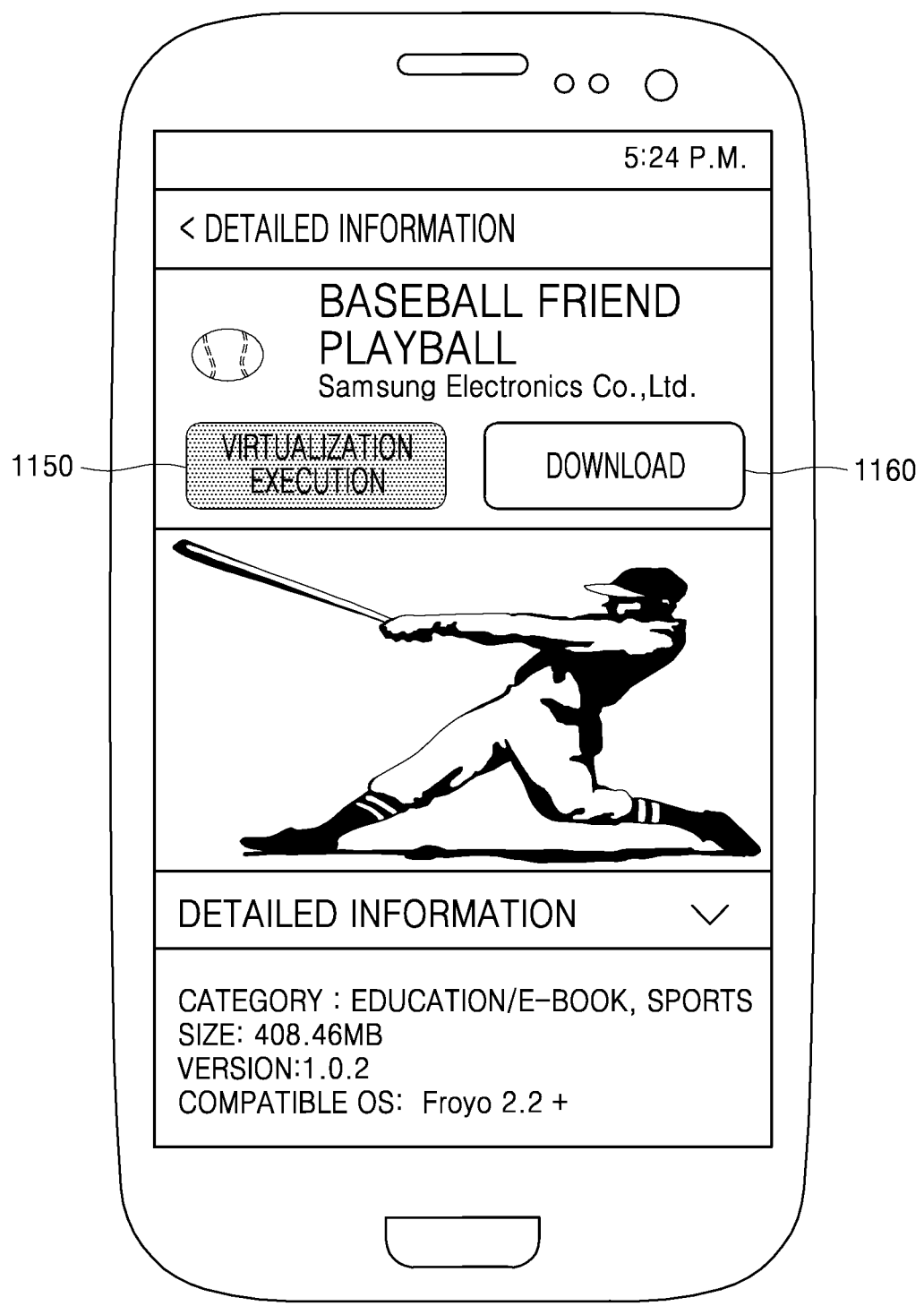

In FIGS. 11B through 11D, items "virtualization execution" 1110, 1130, and 1150 are examples of a UI that is selected by a user to execute a virtual application in the terminal 200. Items "download" 1120, 1140, and 1160 are examples of a UI that is selected by the user to directly download the application from the application server 100 and then to execute the application.

FIG. 11B illustrates a UI of a case in which the terminal 200 determines that the terminal 200 is capable of executing an actual application and a virtual application. The user may select the virtualization execution 1110 or the download 1120 so as to use an application. The determination about the possibility of execution of the virtual application and execution of the actual application is described above with reference to FIGS. 7 through 9.

FIG. 11C illustrates a UI of a case in which the terminal 200 is not capable of executing an actual application but is capable of executing a virtual application. In the UI, selection of the virtualization execution 1130 may be set active but selection of the download 1140 may be set inactive.

FIG. 11D illustrates a UI of a case in which the terminal 200 is capable of executing an actual application but is not capable of executing a virtual application. In the UI, the download 1160 may be set active with respect to selection but the virtualization execution 1150 may be set inactive with respect to selection.

As described above, the terminal 200 may determine whether the terminal 200 may directly execute the application or may indirectly execute the application via virtualization. Thus, although a status of the terminal 200 is not sufficient for execution of the application, or in an environment where the terminal 200 may not execute the application, the terminal 200 may execute the application, and furthermore, the terminal may optimize the execution of the application although an execution environment is changed. Also, since a user may select one of the execution methods, user convenience may be improved.

FIGS. 12A through 12D illustrate UIs that are changed in the terminal 200 based on a possibility of application virtualization, according to another embodiment of the present disclosure.

Figure 12A:
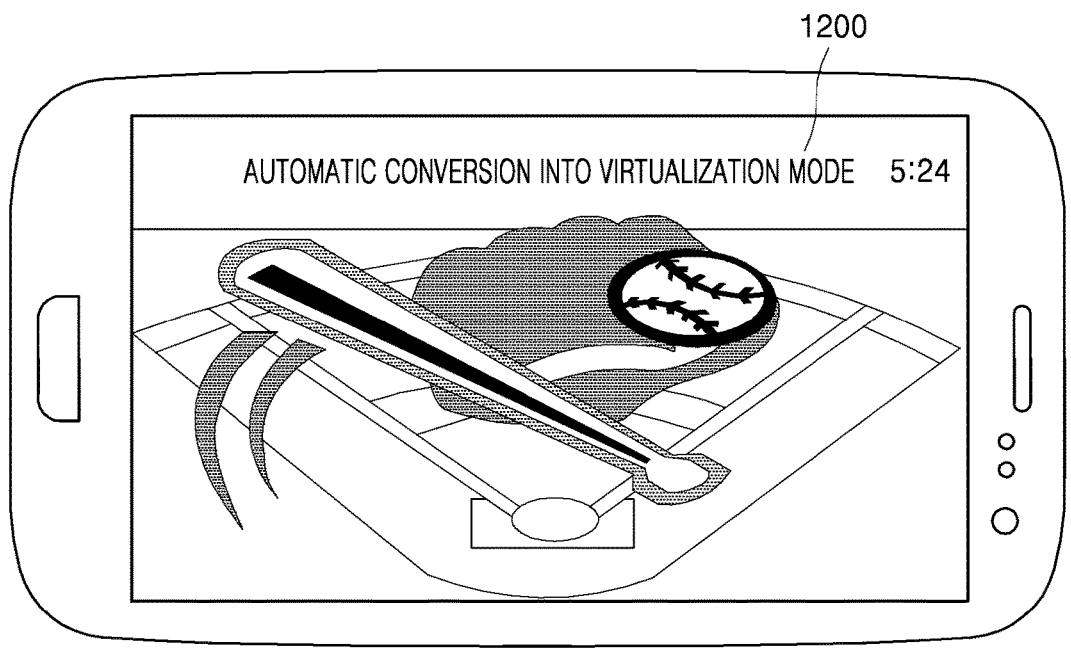
FIGS. 12A through 12D illustrate UIs that are changed in the terminal based on a possibility of application virtualization, according to another embodiment of the present disclosure.

FIG. 12A corresponds to a case in which, when a resource of the terminal 200 is insufficient during execution of an application such that the terminal 200 requests the virtualization server 300 for application virtualization, a UI is provided to a user so as to display and inform the user of a progress of the application virtualization. The determination about a status of the resource during the execution of the application is described above with reference to FIG. 9.

Figure 12B:
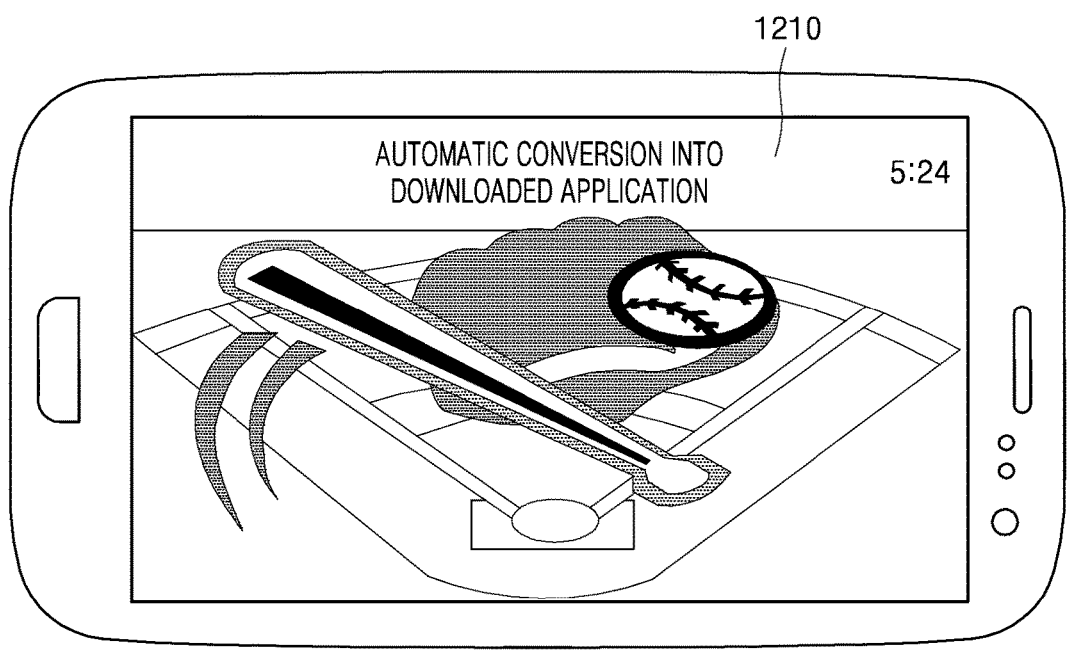

FIG. 12B corresponds to a case in which, when execution of an application is not smooth due to deterioration in a communication speed of a network or an overload of a server, a UI is provided to a user so as to display and inform that the terminal 200 is converted from an application virtualization mode to an actual application execution mode.

The terminal 200 may provide a mode, in which the application is executed, to a user by displaying the mode on its screen. Also, in order to allow the application virtualization mode to be converted by the user, the terminal 200 may have a button to convert the application virtualization mode.

As described above, the terminal 200 may determine capability for execution of an application or execution of a virtual application, and may display a UI on its screen so as to allow the user to select a capable execution mode. With respect to an incapable execution mode, the terminal 200 may display the incapability on the screen by setting a button inactive.

Figure 12C:
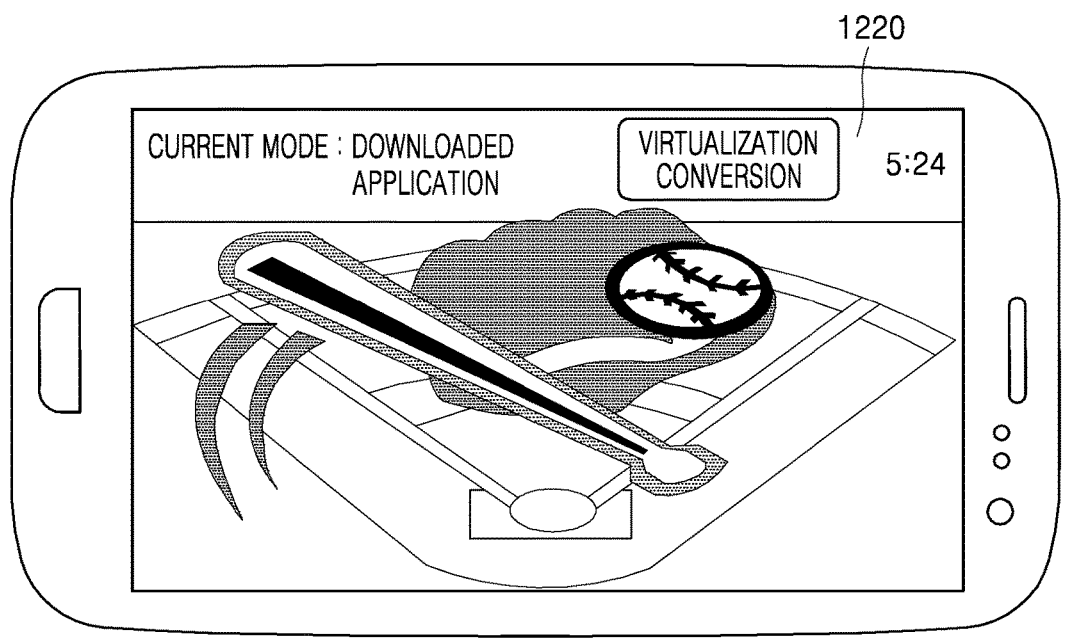

FIG. 12C illustrates a UI displaying that an actual application is currently executed by the terminal 200, and displaying whether a virtual application is executable. When a user selects a button for a virtualization conversion 1220, the terminal 200 may request the virtualization server 300 for application virtualization.

Figure 12D:
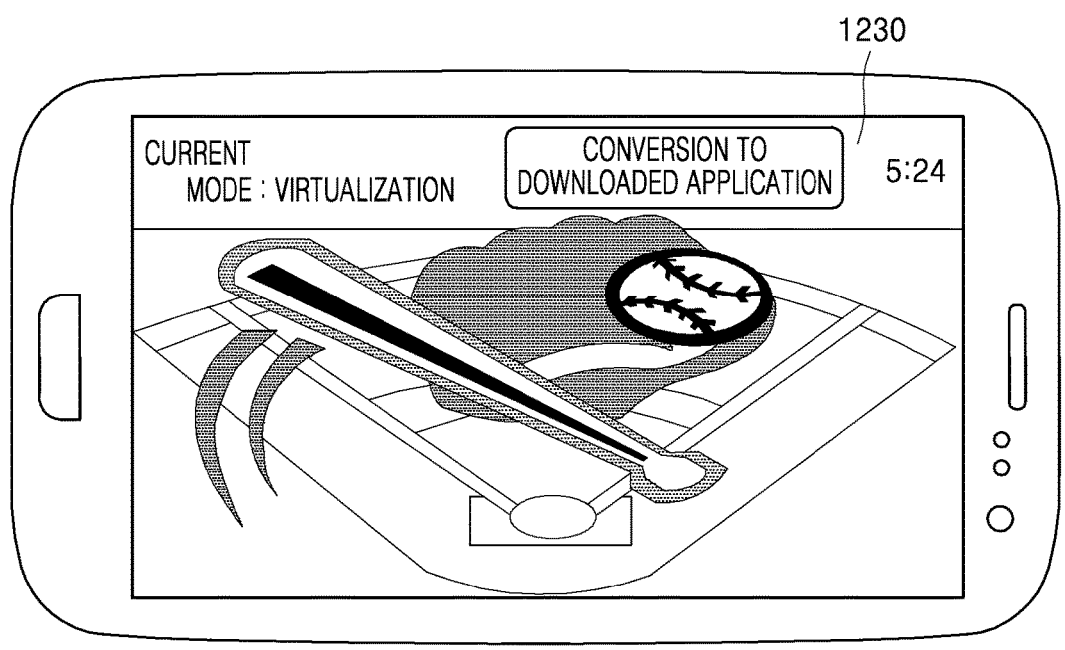

FIG. 12D illustrates a UI displaying that a virtual application is currently executed by the terminal 200, and displaying whether an actual application is executable. When a user selects a button of a 'conversion to downloaded application' 1230, the terminal 200 may request the virtualization server 300 for termination of application virtualization, and may execute the actual application.

The above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD ROM disks, DVDs and Blu-rays; magneto-optical media such as optical discs; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

According to the one or more embodiments of the present disclosure, although it is difficult to execute an application due to different platforms or different versions of a platform for execution of the application, an insufficient storage space in a terminal, or an insufficient performance of a CPU, a GPU, or a memory of the terminal, execution of the application may be optimized according to a status of the terminal, application execution information, a network status, or the like.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A method comprising:
    receiving, by a terminal, execution environment information of an application from an application server, the received execution environment information including recommended performance information of at least one of a processor and a memory to normally execute the application;
    determining, by the terminal, whether the terminal is capable of executing the application, with sufficient resources to normally execute the application on the terminal, by comparing the recommended performance information to an execution environment information of the terminal;
    determining whether the terminal is capable of executing a virtual application of the application; and
    wherein, when the determining determines the terminal is capable of executing the application and the determining determines that the terminal is capable of executing the virtual application, the method includes:
        displaying, on the terminal, an interface so as to allow a user of the terminal to select one of virtualization of the application on a virtualization server that performs application virtualization and execution of the application on the terminal; and
        transmitting, by the terminal, a request to the virtualization server for virtualization of the application or executing, by the terminal, the application, based on an input by the user via the interface.

2. The method of claim 1, further comprising, when virtualization is selected and after the request for virtualization is transmitted:
    receiving, by the terminal, data, from the virtualization server, that configures an execution result screen of the application that is executed in the virtualization server; and
    rendering the execution result screen on the interface by the terminal using the data.

3. The method of claim 1, wherein when execution of the application is selected and before executing the application, downloading, by the terminal, the application from the application server.

4. The method of claim 1, wherein the determining whether the terminal is capable of executing the virtual application includes determining whether the terminal is capable of executing the virtual application based on a network status for communication with the virtualization server.

5. A non-transitory computer-readable recording medium having recorded thereon a program to execute the method of claim 1.

6. A method of virtualizing an application, the method comprising:
    receiving, by a virtualization server which performs application virtualization and provides an application virtualization service, an application virtualization request message from a terminal, the application virtualization request message indicating an application, and a hardware or a software platform optimized for the application;
    in response to receiving the application virtualization request message, performing, by the virtualization server, virtualization on the application that is indicated by the application virtualization request message by
        executing, by the virtualization server, the application on a hardware or a software platform included in the virtualization server based on the hardware or the software platform optimized for the application indicated by the application virtualization request message, and
        transmitting, to the terminal, data, from the virtualization server, that configures an execution result screen of the application,
    wherein the virtualization server stops performing the virtualization on the application, in response to an input via an interface of the terminal, the input being for execution of the application on the terminal.

7. The method of claim 6, further comprising, to perform performing virtualization on the application includes:
    setting, by the virtualization server, a virtual machine for execution of the application based on the application virtualization request message that is received from the terminal.

8. The method of claim 6, wherein the performing of the virtualization further includes:
    before executing the application, determining, by the virtualization server, whether an application is already downloaded to the virtualization server; and
    as a result of the determining that the application has not already been downloaded,
        downloading, by the virtualization server, the application from an application server.

9. A terminal comprising:
    a display;
    a communication interface to communicate with a network;

at least one memory storing instructions; and
at least one processor that executes the instructions to:
receive execution environment information of an application from an application server, the received execution environment information including recommended performance information of at least one of a processor and a memory to normally execute the application;
determine whether the terminal is capable of executing the application, with sufficient resources to normally execute the application on the terminal, by comparing the recommended performance information to an execution environment information of the terminal;
determine whether the terminal is capable of executing the a virtual application of the application;
when the determining determines that the terminal is capable of executing the application and the determining determines the terminal is capable of executing the virtual application,
display, on the display, an interface so as to allow a user of the terminal to select one of virtualization of the application on a virtualization server that performs application virtualization and execution of the application on the terminal; and
transmit a request to the virtualization server for virtualization of the application or execute, by the terminal, the application, based on an input of the user via the interface.

10. The terminal of claim 9, wherein,
when virtualization of the application is selected and after the request for virtualization is transmitted, the at least one processor further executes the instructions to:
receive, from the virtualization server, data that configures an execution result screen of the application that is executed in the virtualization server, and
render the execution result screen by using the data.

11. The terminal of claim 9, wherein when virtualization is selected and before the at least one processor executes the instructions to execute the application, the at least one processor further executes the instructions to:
download the application from the application server and then execute the application.

12. The terminal of claim 9, wherein, to determine whether the terminal is capable of executing the application, the at least one processor
determines whether the terminal is capable of executing the application based on whether the terminal includes a platform in which the application is driven, and hardware or software to drive the application.

13. The terminal of claim 9, wherein, to determine whether the terminal is capable of executing the virtual application, the at least one processor
determines whether the terminal is capable of executing the virtual application based on a network status for communication with the virtualization server.

14. A virtualization server comprising:
a communication interface to communicate with a network;
at least one memory storing instructions; and
at least one processor that executes the instructions to:
receive an application virtualization request message from a terminal via the communication interface, the application virtualization request message indicating an application, and a hardware or a software platform optimized for the application;
in response to receiving the application virtualization request message, perform virtualization on the application that is indicated by the application virtualization request message by
executing the application on a hardware or a software platform included in the virtualization server based on the hardware or the software platform optimized for the application indicated by the application virtualization request message, and
transmitting, to the terminal, data that configures an execution result screen of the application; and
stop performing the virtualization on the application, in response to an input via an interface of the terminal, the input being for execution of the application on the terminal.

15. The virtualization server of claim 14, wherein, to perform virtualization on the application, the at least one processor further executes the instructions to:
set a virtual machine for execution of the application based on the application virtualization request message that is received from the terminal.

16. The virtualization server of claim 14, wherein, to perform virtualization on the application, the at least one processor further executes the instructions to:
before the executing the application, determine whether the application is already downloaded to the virtualization server, and
download the application from an application server, based on a determination that the application had not already been downloaded.

17. A method of executing a virtual application, the method comprising:
requesting application information about an application from an application server by a terminal, the application information including recommended performance information of at least one of a processor and a memory to normally execute the application;
transmitting the application information from the application server to the terminal;
determining, by the terminal, whether the terminal is capable of executing the application, with sufficient resources to normally execute the application on the terminal, by comparing the recommended performance information to an execution environment information of the terminal;
determining whether the terminal is capable of executing the virtual application;
when the determining determines that the terminal is capable of executing the application and the determining determines that the terminal is capable of executing the virtual application,
displaying, on the terminal, an interface so as to allow a user of the terminal to select one of virtualization of the application on a virtualization server that performs application virtualization and execution of the application on the terminal, and
transmitting, by the terminal, a request to the virtualization server for virtualization of the application or executing, by the terminal, the application, based on an input by the user via the interface.

18. The method of claim 17, wherein the application information includes at least one of an application storage capacity, performance information of hardware and software required to execute the application, an identification (ID) and uniform resource locator (URL) of the application server, and virtualization capability of the virtualization server.

19. The method of claim 17, wherein the virtualization server sets a virtual platform required to execute the application based on the application information included in the application virtualization request received from the terminal.

20. The method of claim 17, further comprising requesting, downloading and executing, by the virtualization server, the application from the application server when the application virtualization request is received in the virtualization server.

21. The method of claim 20, wherein the virtualization server transmits a streaming address to the terminal so that the terminal receives a streaming content by accessing the streaming address.

22. The method of claim 20, wherein the virtualization server transmits an output of the executed application to the terminal in real-time.

23. The method of claim 20, wherein the terminal
receives streaming content from the virtualization server
by executing the virtual application received from the
virtualization server, and
reproduces the streaming content.

* * * * *